US010200597B2

(12) United States Patent
Choi et al.

(10) Patent No.: US 10,200,597 B2
(45) Date of Patent: Feb. 5, 2019

(54) METHOD AND APPARATUS FOR PHOTOGRAPHING IN PORTABLE TERMINAL

(71) Applicant: Samsung Electronics Co., Ltd., Suwon-si, Gyeonggi-do (KR)

(72) Inventors: Hongsuk Choi, Suwon-si (KR); Moonsoo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 441 days.

(21) Appl. No.: 14/161,320

(22) Filed: Jan. 22, 2014

(65) Prior Publication Data

US 2014/0204244 A1 Jul. 24, 2014

(30) Foreign Application Priority Data

Jan. 18, 2013 (KR) ........................ 10-2013-0006144

(51) Int. Cl.
*H04N 5/232* (2006.01)

(52) U.S. Cl.
CPC ..... *H04N 5/23216* (2013.01); *H04N 5/23222* (2013.01); *H04N 5/23293* (2013.01)

(58) Field of Classification Search
None
See application file for complete search history.

(56) References Cited

U.S. PATENT DOCUMENTS

| 9,049,363 | B2 | 6/2015 | Choi et al. |
| 9,386,263 | B2 | 7/2016 | Iwamoto et al. |
| 2006/0290932 | A1* | 12/2006 | Kawanami ............... G02B 7/34 356/370 |
| 2007/0140675 | A1 | 6/2007 | Yanagi |
| 2007/0146528 | A1* | 6/2007 | Yanagi ................. H04N 1/3875 348/333.01 |
| 2010/0259645 | A1* | 10/2010 | Kaplan ................ G11B 27/034 348/231.99 |
| 2010/0302408 | A1* | 12/2010 | Ito ........................ H04N 1/0035 348/231.99 |
| 2012/0147200 | A1 | 6/2012 | Watanabe et al. |
| 2012/0257071 | A1 | 10/2012 | Prentice |
| 2012/0268615 | A1* | 10/2012 | Choi .................... H04N 5/2621 348/211.99 |
| 2012/0307103 | A1 | 12/2012 | Kunishige et al. |
| 2013/0117645 | A1* | 5/2013 | Butlin ................. G06F 17/3089 715/205 |

(Continued)

FOREIGN PATENT DOCUMENTS

| CN | 101026689 A | 8/2007 |
| CN | 101222582 A | 7/2008 |

(Continued)

*Primary Examiner* — Roberto Velez
*Assistant Examiner* — Yih-Sien Kao
(74) *Attorney, Agent, or Firm* — Jefferson IP Law, LLP

(57) ABSTRACT

A method and an apparatus for photographing using a portable terminal are provided. The apparatus includes an interface for intuitively identifying different photographing compositions in a preview mode and supports photographing a subject according to each composition selected by a user in the interface. The method includes driving a camera module and displaying a plurality of images in a multi-preview window corresponding to a plurality of compositions.

27 Claims, 32 Drawing Sheets

(56) References Cited

U.S. PATENT DOCUMENTS

2014/0185925 A1* 7/2014 Datta ................... G06K 9/6256
382/159

FOREIGN PATENT DOCUMENTS

| CN | 102761687 A | | 10/2012 |
|----|-------------|---|---------|
| JP | 2002-142148 A | | 5/2002 |
| JP | 2004109247 A | * | 4/2004 |
| JP | 2006-074558 A | | 3/2006 |
| JP | 2007-274581 A | | 10/2007 |
| JP | 2007-295529 A | | 11/2007 |

* cited by examiner

METHOD AND APPARATUS FOR PHOTOGRAPHING IN PORTABLE TERMINAL

CROSS-REFERENCE TO RELATED APPLICATION(S)

This application claims the benefit under 35 U.S.C. § 119(a) of a Korean patent application filed on Jan. 18, 2013 in the Korean Intellectual Property Office and assigned Serial number 10-2013-0006144, the entire disclosure of which is hereby incorporated by reference.

TECHNICAL FIELD

The present disclosure relates to a method and an apparatus for photographing using an electronic device, such as a camera device, a portable terminal including a camera or a camera module, and the like. More particularly, the present disclosure relates to a method and an apparatus for photographing using a portable terminal which provides an interface for intuitively identifying different photographing formats (e.g. compositions) in a preview mode and supports photographing a subject according to each format (composition) selected by a user through the interface.

BACKGROUND

Recently, electronic devices, such as camera devices, portable terminals having a camera or a camera module, and the like, (hereafter referred to as a 'portable terminal') provide a high resolution image and various convenient functions for a user. The portable terminal having a photographing function of the camera or the camera module can photograph images having a resolution higher than a full High Definition (full HD) class through an image sensor (i.e., a camera sensor).

The portable terminal can display an image detected by the camera module in a preview mode as a preview image. The photographing is generally performed by pressing a shutter button in the state of displaying the preview image. Generally, the portable terminal provides a preview window in the preview mode according to only one composition (which may also be described as a format).

Accordingly, if a user wants to photograph by identifying various formats or compositions in the preview mode, the user must take a first photo and another photo having a different composition after identifying photographing data of the first photo, or must take a photo after changing the settings of compositions by operating the portable terminal in the preview mode and re-entering the preview mode. Accordingly, if the user wants to take photos according to various styles or directions by using the various compositions, the user must repeat complicated operations of the portable terminal. Accordingly, the user is inconvenienced due to a photographing delay. More specifically, if the user cannot select a plurality of compositions at one time, the user is inconvenienced since the portable terminal supports photographing according to only one composition.

Therefore, a need exists for a method and an apparatus for photographing using a portable terminal configured to display a plurality of display images for each photographable composition in a preview mode, and to photograph an image according to a composition selected by a user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for photographing using a portable terminal configured to display a plurality of display images for each photographable composition in a preview mode, and photographing an image according to a composition selected by a user.

Another aspect of the present disclosure is to provide a method and an apparatus for photographing using a portable terminal which supports a multi-preview mode for displaying a plurality of preview images corresponding to each composition through independently configured preview windows and a photographing function in the multi-preview mode.

Another aspect of the present disclosure is to provide a method and an apparatus for photographing using a portable terminal which enables direct photographing if a specific composition is selected or to display a preview image having the selected composition by switching to a full preview window in a multi-preview mode.

Another aspect of the present disclosure is to provide a method and an apparatus for photographing using a portable terminal which improves usability of the portable terminal by optimizing an environment of photographing.

It will be appreciated that the term "composition" used throughout the specification may alternatively be described as a "format", and in certain embodiments generally should be interpreted as encompassing at least one of an artistic arrangement of elements or parts of a picture or an image, an arrangement, a disposition, a layout, a design, an organization, a construction, style, or an appearance of elements or parts of a picture or an image, a framing mode, a screen aspect ratio, an effect, a degree of zoom, and the like.

In order to address the above issues, a method for photographing using a portable terminal includes driving a camera module and displaying a plurality of images in a multi-preview mode corresponding to a plurality of formats (compositions).

In accordance with an aspect of the present disclosure, a method for photographing using a portable terminal is provided. The method includes executing a preview mode according to an activation of a camera module, obtaining a plurality of images corresponding to a plurality of compositions in the preview mode, displaying the plurality of images in a multi-preview mode corresponding to the plurality of compositions, and photographing based on a display image having at least one composition according to a user's selection in the multi-preview mode.

In accordance with another aspect of the present disclosure, a method for photographing using a portable terminal is provided. The method includes selecting a preview display method in a preview mode, displaying a plurality of display images corresponding to a plurality of compositions if the preview display mode is a multi-preview mode, and photographing corresponding to at least one composition selected by a user in the multi-preview mode.

In order to perform the above method in a processor according to an embodiment of the present disclosure, a recording media including a program executed by the processor and readable by a computer may be included.

In accordance with another aspect of the present disclosure, a mobile terminal is provided. The mobile terminal includes a camera module configured to obtain an image, a display unit configured to display a multi-preview, and a control unit configured to control the multi-preview display by obtaining a plurality of images corresponding to a plurality of compositions while driving the camera module.

In accordance with another aspect of the present disclosure, an electronic device (e.g. a mobile terminal) is provided. The mobile terminal includes a camera module configured to obtain an image, a display unit configured to display a preview image in a basic preview mode, a single preview mode, or a multi-preview mode, a storage unit configured to store setting information related to the photographing, to buffer at least one image when entering the preview mode, and to store photographed images, and a control unit configured to form a plurality of preview windows for each composition determined by a user while displaying the multi-preview, to control so that the images obtained by the camera module are displayed through the plurality of preview windows, and to control photographing corresponding to at least one composition and according to a user's photographing command in the multi-preview mode.

In accordance with another aspect of the present disclosure, a recording media is configured to form a plurality of preview windows for each composition determined by a user while displaying the preview windows in a multi-preview mode, to display images obtained by the camera module through the plurality of preview windows, and to be read by a computer installed with a program so that a photographing can be performed corresponding to at least one composition and according to a user's photographing command.

The above description will be made by extending the characteristics and technical benefits of the present disclosure so that one of ordinary skill in the art can understand from the following descriptions of the present disclosure. Besides the above characteristics and benefits, additional characteristics and benefits configured in the claims and descriptions of the present disclosure will be helpful for understanding the scope and spirit of the disclosure.

According to the method and apparatus for photographing using a portable terminal of the present disclosure, a user can set different compositions for each preview window and take photos having various styles and directions at an identical time, a location, and a subject by using the different compositions through multi-preview windows. Further, the user can identify various compositions optimized for a screen ratio, a framing mode, a horizontal or vertical direction, an extension or a contraction, and an effect in a preview mode while photographing using the portable terminal. Accordingly, an easier photographing can be achieved through the optimized compositions.

As described above, according to the present disclosure, user conveniences are improved because the photographing is performed by selecting at least one composition after intuitively identifying and comparing a plurality of compositions, such as a screen ratio, a framing mode, an effect, use, and the like.

Therefore, the present disclosure provides improved user conveniences and may contribute to the improvement of usability, convenience, and competitiveness of the portable terminal by optimizing the environment for photographing. The present disclosure can be applied to all types of portable terminals and the corresponding various devices.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures

DETAILED DESCRIPTION

Figure 1:
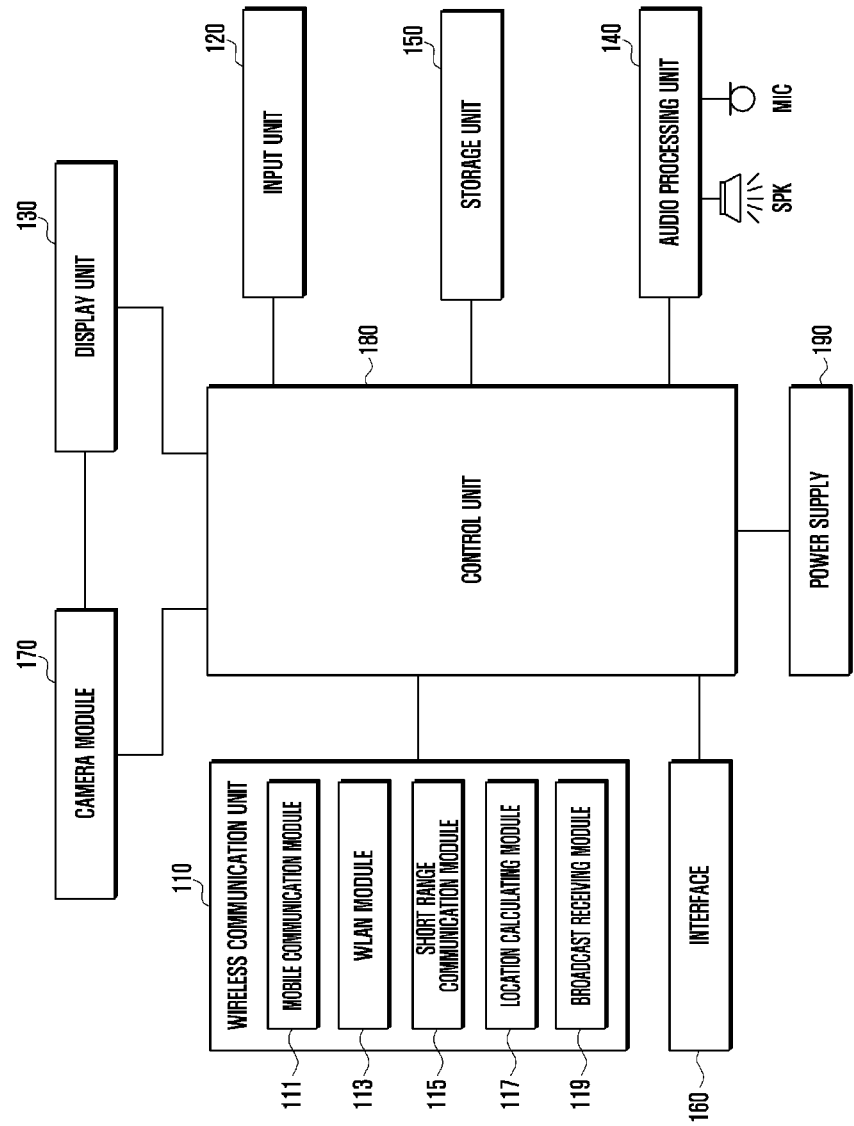
FIG. 1 is a schematic diagram illustrating a configuration of a portable terminal according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

For the same reasons, some components in the accompanying drawings are emphasized, omitted, or schematically illustrated, and the size of each component does not fully reflect the actual size. Therefore, the present disclosure is not limited to the relative sizes and distances illustrated in the accompanying drawings.

The present disclosure relates to a method and an apparatus (e.g. an electronic device) for photographing using a camera device or a portable terminal having a camera module (hereafter, 'portable terminal' is commonly used). More particularly, an embodiment of the present disclosure provides an interface for displaying a plurality of photographable compositions in a preview mode and for selecting at least one composition, and enables a user to photograph a subject according to the at least one composition selected by the user in the interface. More specifically, the embodiment of the present disclosure provides a method and an apparatus for photographing which displays preview images obtained by a camera module in preview windows divided according to various compositions set by the user, selects at least one composition from the plurality of preview windows according to a user's decision, and stores a preview image by capturing the preview image according to the composition selected by the user.

In an embodiment of the present disclosure, the composition may indicate a screen configuration for effectively photographing a subject according to a user's intention in a limited space. More particularly, the composition is used as a term covering a framing mode, a screen ratio (i.e., an aspect ratio), an effect, use, and the like, according to a photographing method. A "composition" may alternatively be described as a "format".

In an embodiment of the present disclosure, the framing mode disposing a subject in a screen having a rectangular frame (i.e., a window) may be divided into an extreme close-up shot, a big close-up shot, a close-up shot, a bust shot, a waist shot, a knee shot, a full shot, a long shot, and an extreme long shot, and the like, according to the distance between the subject and photographer and a selected range of body.

Here, the extreme close-up shot photographs a subject (i.e., a human body) by approaching a portion of the subject as possible, which is a photographing method for portraying pupils, fingers, lips of a person, or the like. The big close-up shot photographs a subject by approaching the subject so that eyes, nose, mouth of a person are included in an image, which is a photographing method for framing a portion of the subject from a forehead to a jaw. The close-up shot is a photographing method for framing a portion of a subject from a face to shoulders. The bust shot is a photographing method for framing the vicinity of a chest, and used to photograph a small motion, such as a face motion, a hand motion, an arm motion, and the like. The waist shot is a photographing method for framing a portion of the subject from the vicinity of a waist, and used for photographing a light motion including a face motion and an upper body motion. The knee shot is a photographing method for framing a portion of the subject from a knee to the upper side, and used for photographing a motion of the knee or used when a photographing distance is closer than that of a full shot. The full shot is referred to as an entire body shot, and used for photographing by framing from the top of the head of the subject to the bottom of the subject's feet. The long shot is a photographing method for framing a small size of a human body and portraying a wide background or landscape by keeping a further distance from the subject, whereas the full shot frames from the top of the head of the subject to the bottom of the subject's feet. The extreme long shot is a photographing method for photographing a subject or a plurality of subjects in a very small size by locating the subjects at a further distance and portraying the landscape in priority.

In an embodiment of the present disclosure, the screen ratio indicates a ratio of length to width of a captured image and may include ratios, such as 1:1, 3:2, 4:3, 16:9, 1.85:1, and 2.35:1.

In an embodiment of the present disclosure, the effect may include various effects applicable to photographing, such as a sketch, black and white, sepia, distortion, synthesis, an animation, vignetting, vintage, a color transformation, pastel, glow-in-the-dark, an improvement of image quality, a background change, panorama, and the like.

In an embodiment of the present disclosure, the use indicates an object of user's photographing data, and may be divided into a general storage, a web upload, a mobile transmission, a message transmission, and a Social Networking Service (SNS) transmission according to the size of photographing data.

An embodiment of the present disclosure provides a multi-preview method for simultaneously displaying various compositions, such as a framing mode, a screen ratio, an effect, use, and the like, through a plurality of divided preview windows in a preview mode. Accordingly, a user can identify various compositions optimized for photographing, such as a horizontal or vertical direction, an extension or contraction, and an effect in the preview mode, and can perform an easier photographing desired by the user through the optimized compositions. Here, the plurality of compositions for configuring a plurality of preview windows in a preview mode may be provided in a plug-in form, or defined by user settings. More specifically, the user can set various compositions for photographing in the portable terminal by selecting and downloading from a server, such as a market, and thereby a photographing guide using the various compositions and an update of the portable terminal can be performed with ease.

According to an embodiment of the present disclosure, by processing each frame image obtained by the camera module in a preview mode, the portable terminal can generate an entire image of a full resolution (i.e., a still image) by capturing according to each composition and displaying through preview windows configured according to the plurality of compositions set by the user (for example, at least one of a framing mode, a screen ratio, an effect, use, and the like).

More specifically, while photographing with a portable terminal installed with a camera module, a screen of a display unit may be divided into a plurality of preview windows and arranged according to user settings. Each composition can be identified through the arranged preview windows, and each image of the subject obtained by the camera module may be displayed in each preview window according to the composition set for the preview window. Subsequently, if the user selects at least one composition for photographing from images displayed in the preview windows, the portable terminal captures and stores a still image corresponding to the at least one selected composition.

In an embodiment of the present disclosure, a plurality of preview windows displaying images is provided in a screen, and the images in each preview window may be displayed according to at least one composition set for the preview windows. More specifically, each image applied with at least one composition may be displayed through the plurality of preview windows. The images may be differently displayed in the preview windows according to the compositions. More specifically, a plurality of compositions may be applied to a display image, and a plurality of preview windows provided in a screen may have different forms. For example, a plurality of images having different framing modes may be displayed in the preview windows, a plurality of images having different screen ratios may be displayed in the preview windows, a plurality of images having different effects may be displayed in the preview windows. Further, a plurality of images applied with at least one composition including a framing mode, a screen ratio, an effect, and their combination may be displayed in the plurality of preview windows.

The display image may have a smaller size than the still image or the same size as the still image. In this case, the portable terminal obtains images from the camera module at every frame, displays the obtained images in the display unit by converting to preview images, and may buffer a full resolution image obtained from the camera module to save as a still image. If a request for capturing an image is generated through a shutter button, the portable terminal may select and store a frame image from the buffered frame images by compressing and encoding the frame image at the time of requesting the capture of an image (i.e., at the time of pressing a shutter button or selecting a specific preview window from the preview windows having different screen ratios). Accordingly, the portable terminal according to an embodiment of the present disclosure may include a buffer for the operation of displaying an image in the preview mode and for temporarily storing a full resolution image (still image) independently or in parallel.

By using the above configuration, the portable terminal can buffer full resolution images in the buffer while driving the camera module. If a user selects a preview window or requests for capturing an image by pressing a shutter button, the portable terminal stores an image selected from the buffered frame images by capturing the frame according to the request for capturing an image.

In the meantime, the full resolution image (still image) refers to an image obtained by the camera module, and the image may be one obtained by an image sensor in an unsealed state. Further, the display image indicates an image displayed in the display unit in a preview mode, and the image obtained by the image sensor may be scaled to a certain size or screen ratio.

In an embodiment of the present disclosure, image scaling refers to adjusting the full resolution image to a certain size or screen ratio. The image scaling may be performed by a resizing method, or an addition and averaging method. Here, the resizing method refers to adjusting an image by a decimation, interpolation, and cropping. The addition and averaging method refers to adjusting the number of pixels by combining adjacent pixels to one pixel, and thereafter the decimation, interpolation, and cropping may be performed.

Hereinafter, a configuration and control method of a portable terminal according to an embodiment of the present disclosure are described referring to the accompanying drawings. The configuration and control method of a portable terminal according to an embodiment of the present disclosure are not limited to the following descriptions, and may be applied to various embodiments.

FIG. 1 is a schematic diagram illustrating a configuration of a portable terminal according to an embodiment of the present disclosure.

Referring to FIG. 1, the portable terminal is configured with a wireless communication unit 110, an input unit 120, a display unit 130, an audio processing unit 140, a storage unit 150, an interface 160, a camera module 170, a control unit 180, and a power supply 190. The portable terminal may include the components illustrated in FIG. 1. However, all the components are not essential, and more or less components may be included in the portable terminal. For example, if the portable terminal supports the photographing function and does not support a communication function, the wireless communication unit 110 can be omitted.

The wireless communication unit 110 may include at least one module for enabling a wireless communication between the portable terminal and a wireless communication system or between portable terminals. For example, the wireless communication unit 110 may be configured with a mobile communication module 111, a Wireless Local Area Network (WLAN) module 113, a short range communication module 115, a location calculating module 117, and a broadcast receiving module 119.

The mobile communication module 111 may exchange wireless signals with at least one of a base station, an external terminal, and a server in a mobile communication network. The wireless signal may include various types of data according to the exchange of voice communication signal, video communication signal, character/multimedia message, or the like. The mobile communication module 111 may download a composition installation application in a plug-in type according to a user's selection by connecting to a server, such as a market, under the control of control unit 180.

The WLAN module 113 connects to a wireless Internet and forms a WLAN link with another WLAN module, and can be installed in the portable terminal or externally. As a wireless Internet technology, a WLAN (Wi-Fi), Wireless broadband (Wibro), World Interoperability for Microwave Access (Wimax), and High Speed Downlink Packet Access (HSDPA) may be used. The WLAN module 113 may download a composition installation application in a plug-in type according to a user's selection by connecting to a server, such as a market, under the control of control unit 180. Further, the WLAN module 113 may exchange photo data selected by a user with another portable terminal when the WLAN link is formed with another terminal. Alternatively, the WLAN module 113 may transmit the photo data selected by the user to a cloud server through the WLAN or download photo data from the cloud server.

The short range communication module 115 performs a short range communication. As the short range communication technology, Bluetooth, Radio Frequency Identification (RFID), Infrared Data Association (IrDA), Ultra Wideband (UWB), ZigBee, and Near Field Communication (NFC) can be used. Further, the short range communication module 115 may exchange photo data selected by the user when the portable terminal is connected to another portable terminal through the short range communication.

The location calculating module 117 is a module for obtaining a location of the portable terminal, such as a Global Position System (GPS) module. The location calculating module 117 can calculate the current location information in 3 dimensions of longitude, latitude, and altitude by calculating distances to more than 2 base stations and a correct time, and by applying the calculated information to the triangulation method. Alternatively, the location calculating module 117 can calculate the location information of a portable terminal by receiving data from more than 2 satellites. Further, the location information of a portable terminal may be obtained in various methods.

The broadcast receiving module 119 may receive broadcast signals (for example, a TV broadcast signal, a radio broadcast signal, and data broadcast signal) and/or information related to broadcasting (for example, a broadcast channel, a broadcast program, or information related to a broadcast service provider) from an external broadcast management server through a broadcast channel (for example, a satellite channel, a ground-wave channel, and the like).

The input unit 120 generates user input data for the control of the portable terminal. The input unit 120 may be configured with a key pad, a dome switch, a touchpad (i.e., pressure sensitive/capacitive type), a jog wheel, a jog switch, or the like. The input unit 120 may be provided in a button form on the outer surface of the portable terminal, and a portion of the buttons may be provided in a touch panel. The input unit 120 generates input data when a user input is received for photographing (that is, capturing and storing) an image.

The display unit 130 outputs information processed by the portable terminal. For example, the portable terminal displays a screen interface related to a telephone, such as a User Interface (UI) or a Graphical UI (GUI), in a telephone mode. Further, the display unit 130 displays a photographed and/or received image, a UI, or a GUI when the portable terminal is in a video telephone mode or a photographing mode. More particularly, the display unit 130 can display various UI and GUI related to the operation of photographing while driving the camera module 170. More specifically, the display unit 130 can perform a function of displaying an image photographed by the camera module 170 and photographing information. For example, the display unit 130 displays a preview image transmitted by the camera module 170.

Here, the display unit 130 displays a plurality of preview windows in a screen, and displays preview images applied with at least one composition through the preview windows. When displaying the preview images, the display unit 130 displays the plurality of preview windows according to a plurality of compositions set by a user, and displays the preview image applied with at least one composition (for example, a framing mode, a screen ratio, an effect, use, and the like) set by the user through each preview window. The display unit 130 displays preview images having different compositions through the plurality of preview windows, and can also display a preview image having a specific composition selected by the user by switching to a full preview window. Further, the display unit 130 receives a user input through at least one preview window, and transmits a user's input signal to the control unit 180. The display unit 130 can support screen displays of a landscape mode and a portrait mode according to the rotation or direction of a portable terminal, and support a switching of screen displays between the landscape mode and the portrait mode. Screen illustrations of the display unit 130 operated by the present disclosure will be described below.

The display unit 130 may include at least one of a Liquid Crystal Display (LCD), a Thin Film Transistor-LCD (TFT LCD), an Organic Light Emitting Diode (OLED), an Active Matrix OLED (AMOLED), a flexible display, a bended display, a 3-dimensional (3D) display, and the like). Some of these displays may be configured with a transparent display (i.e., transparent or photo transparent) so that the other side can be seen.

If the display unit 130 is configured with a touch panel detecting a touch operation in a layer structure (hereafter, a 'touch screen'), the display unit 130 may be used as an input device as well as an output device. The touch panel may be configured so that a pressure applied to a specific part of the display unit 130 or a capacitance generated from a specific part of the display unit 130 is converted to an electric input signal. The touch panel may be configured so that not only the touched location and area but also a touch pressure can be detected. If a touch input is generated from the touch panel, corresponding signals are transmitted to a touch controller (not shown). The touch controller processes the signals and transmits corresponding data to the control unit 180. Accordingly, the control unit 180 can identify which area of the display unit 130 is touched.

The audio processing unit 140 transmits an audio signal received from the control unit 180 to a Speaker (SPK), and transmits an audio signal, such as a voice, received from a Microphone (MIC) to the control unit 180. The audio processing unit 140 outputs voice/sound data to the SPK by converting to an audible sound under the control of the control unit 180, and transmits an audio signal, such as a voice, received from the MIC to the control unit 180 by converting to a digital signal.

The SPK may output audio data received from the wireless communication unit 110 in a telephone mode, a recording mode, a voice recognition mode, a broadcast receiving mode, and a photographing mode, or audio data stored in the storage unit 150. The speaker can also output a sound signal related to the operation of a portable terminal (for example, telephone reception, telephone transmission, photographing, playing of music files, and the like).

The MIC receives external sound signals in a telephone mode, a recoding mode, a voice recognition mode, and a photographing mode, and processes to an electric voice data. In the telephone mode, the processed voice data may be output to a mobile communication base station by converting to a transmittable form through the mobile communication module 111. The MIC may be provided with an algorithm in order to reduce noise generated in the process of receiving the external sound signals.

The storage unit 150 may store programs for the operation and control of the control unit 180, and perform a function of temporarily storing input/output data (for example, telephone number, message, audio, video, image, electronic book, and the like). Further, the storage unit 150 may store the frequency of use of a portable terminal according to the operation of the portable terminal (for example, frequency of using an application, frequency of using a composition for photographing, frequencies of using a telephone number, message, and multimedia), importance, and priority. The storage unit 150 may also store data related to various patterns of vibration and sound output while inputting a touch through the touch screen. The storage unit 150 may store photographing data, such as a still image, a moving image, information of various compositions, a composition installation application, and the like. The composition installation application may be provided in a plug-in form additionally installed by downloading through the wireless communication unit 110. Further, the storage unit 150 may buffer and store a first image converted from a display image according to a plurality of compositions and a second image converted from a full resolution image according to the plurality of compositions. In the present disclosure, the storage unit 150 may operate as a display image buffer and a still image buffer, which will be described below.

The storage unit 150 may include at least one storage media of a flash memory, a hard disk, a micro card (for example, a Secure Digital (SD) card or XD card), a Dynamic Random Access Memory (DRAM), a Static RAM (SRAM), a Read-Only Memory (ROM), a Programmable ROM (PROM), an Electrically Erasable PROM (EEPROM), a Magnetic RAM (MRAM), a magnetic disk, an optical disk, and the like. The portable terminal may operate in relation to a web storage performing a storage function in the Internet.

The interface 160 forms a path to all the external device connected to the portable terminal. The interface 160 receives data from the external devices, receives an electric power, and supplies the received data to each internal component of the portable terminal, or lets internal data of the portable terminal to be transmitted to the external devices. For example, a wired/wireless headset port, an external charger port, a wired/wireless data port, a memory card port, a connection port having a recognition module, an audio input/output port, a video input/output port, an earphone port, and the like, may be included in the interface 160.

The camera module 170 is a component supporting a photographing function of the portable terminal. More specifically, the camera module 170 supports photographing a still image and a moving image of a subject. The camera module 170 photographs a subject under the control of the control unit 180, and may transmit photographed image data to the display unit 130 and the control unit 180. For example, the camera module 170 may be configured with an image sensor (i.e., a camera sensor) converting an incident light signal to an electric signal and an image signal processor converting the electric signal received from the image sensor to a digital image data. The image sensor may include a Charge-coupled Device (CCD) sensor or a Complementary Metal Oxide Semiconductor (CMOS) sensor. More particularly, the camera module 170 can support an image processing function for photographing according to various compositions set by a user (for example, a framing mode, a screen ratio, an effect, use, and the like). A configuration and operation of the camera module 170 applied by the present disclosure will be described below.

The control unit 180 controls the general operation of the portable terminal. For example, the control unit 180 may perform controls related to a voice communication, data communication, and video communication. More particularly, the control unit 180 can perform a control related to a photographing function having various compositions according to an embodiment of the present disclosure. The control unit 180 may include a multimedia module (not shown) for processing the photographing function having various compositions. According to the present disclosure, the multimedia module may be installed in the control unit 180 or provided separately from the control unit 180.

According to the embodiment of the present disclosure, the control unit 180 controls to display preview windows through the display unit 130 by configuring according to compositions set by the user in a preview mode, and to display an image applied with at least one composition through the preview windows. Further, the control unit 180 can control a photographing operation (i.e., capturing and storing an image) according to user settings in a state of outputting display images applied with different compositions through a plurality of preview window.

For example, if a display image is selected from a plurality of images applied with different compositions in preview windows, the control unit 180 controls photographing according to the composition of the selected image. Alternatively, the control unit 180 may control to display the selected image by converting to a full preview image, and to display the full preview image according to the composition of the selected image. Further, when photographing one of images displayed in the plurality of preview windows, the control unit 180 may maintain the preview mode in photographing according to the selected display image and support a continuous photographing according to the composition of selected image. Further, if at least 2 compositions (or display images) are selected and a photographing command is input, the control unit 180 may control photographing all the plurality of display images corresponding to the plurality of selected compositions.

When photographing an image corresponding to at least one composition according to a user's photographing command in the state of displaying a multi-preview window, the control unit 180 compares the current photographing situation and set compositions, and thereby can identify the similarity between them. The control unit 180 may control photographing by excluding the compositions similar to the current photographing situation (i.e., compositions overlapping the current photographing situation). More specifically, the control unit 180 can apply a composition (for example, an effect) according to the photographing situation and control photographing accordingly. For example, when photographing by applying a specific effect, the control unit 180 identifies the current photographing situation from an image obtained by the camera module 170, and may control photographing by excluding the specific effect if the photographing situation overlaps the specific effect. In the present disclosure, the photographing situation may include an environment of photographing corresponding to compositions (i.e., an effect) and similar tones (or colors) settable by the portable terminal, such as an autumn landscape, a water body (i.e., a sea), a sunset, and the like.

Further, the control unit 180 can control to output at least one of an acoustic sense (sound), a visual sense (display), and a tactile sense (vibration) as a feedback informing the user that a preview window is selected, if the preview window of a specific composition is selected in the preview mode.

According the embodiment of the present disclosure, the control unit 180 controls a multi-preview window displaying a plurality of images corresponding to a plurality of compositions set by a user in the display unit 130 when entering the preview mode. The control unit 180 recognizes a display image in the preview window selected from the plurality of display images corresponding to compositions set by the user, and controls photographing according to the selected composition. More specifically, when photographing with the portable terminal having a camera module 170, the control unit 180 may arrange the preview images by dividing the screen of the display unit 130 according to the user settings. The control unit 180 identifies compositions set for the arranged preview windows, and controls the display image obtained by the camera module 170 by classifying according to the composition settings of preview windows. Subsequently, if the user selects a specific composition from different compositions of display images in the preview windows, the control unit 180 may store a still image in the storage unit 150 by capturing according to the selected composition.

The control unit 180 may process the display image and a full resolution image (still image) independently or in parallel by dividing them. The control unit 180 controls the camera module 170 to process the display image in the preview mode, and controls the camera module 170 so that a preview processing of the display image and a processing of image conversion in background can be performed simultaneously in the capture mode.

Further, when obtaining a plurality of display images for the multi-preview mode, the control unit 180 may control to use a division photographing method for obtaining an image in a frame period through the camera module 170 corresponding to the plurality of preview windows or a continuous photographing method for sequentially obtaining a plurality of images in every frame period through the camera module 170 corresponding to the plurality of preview windows. The division photographing method and continuous photographing method according to an embodiment of the present disclosure will be described referring to the accompanying drawings.

An operation control of the control unit 180 will be described by using operations and a control method thereof referring to the accompanying drawings.

The power supply 190 receives an internal or an external electric power and supplies electric power needed for each component of a portable terminal under the control of the control unit 180.

In the meantime, various embodiments of the present disclosure may utilize a software, hardware, or their combination through a recording media readable by a computer or a similar device. For the hardware, the various embodiments described in the present disclosure may utilize at least one of an Application Specific Integrated Circuits (ASICs), Digital Signal Processors (DSPs), Digital Signal Processing Devices), Programmable Logic Devices (PLDs), Field Programmable Gate Arrays (FPGAs), processors, controllers, micro-controllers, microprocessors, an electric unit for executing other functions, and the like. In some cases, the embodiment described in the present disclosure may use the control unit 180 integrally configured. For the software, the embodiment described in the present disclosure may utilize software modules, such as a procedure, functions, and the like. Each software module can perform at least one function and operation described in the present disclosure.

Here, the recording media may be readable by a computer and include a program for configuring preview windows according to compositions set by a user while displaying a multi-preview window, displaying images obtained by the camera module 170 through a plurality of preview windows corresponding to the compositions, and executing a photographing corresponding to at least one composition according to a user's photographing command.

The portable terminal of the present disclosure illustrated in FIG. 1 may include all the information and communication devices, multimedia devices, and their applications, which use an Application Processor (AP), a Graphic Processing Unit (GPU), a Central Processing Unit (CPU), and the like. For example, the portable terminal may include devices, such as a mobile communication terminal, operating by communication protocols for various communication systems, a tablet Personal Computer (PC), a smart phone, a digital camera, a Portable Multimedia Player, a media player (PMP), a portable game terminal, a Personal Digital Assistant (PDA), and the like.

Figure 2:
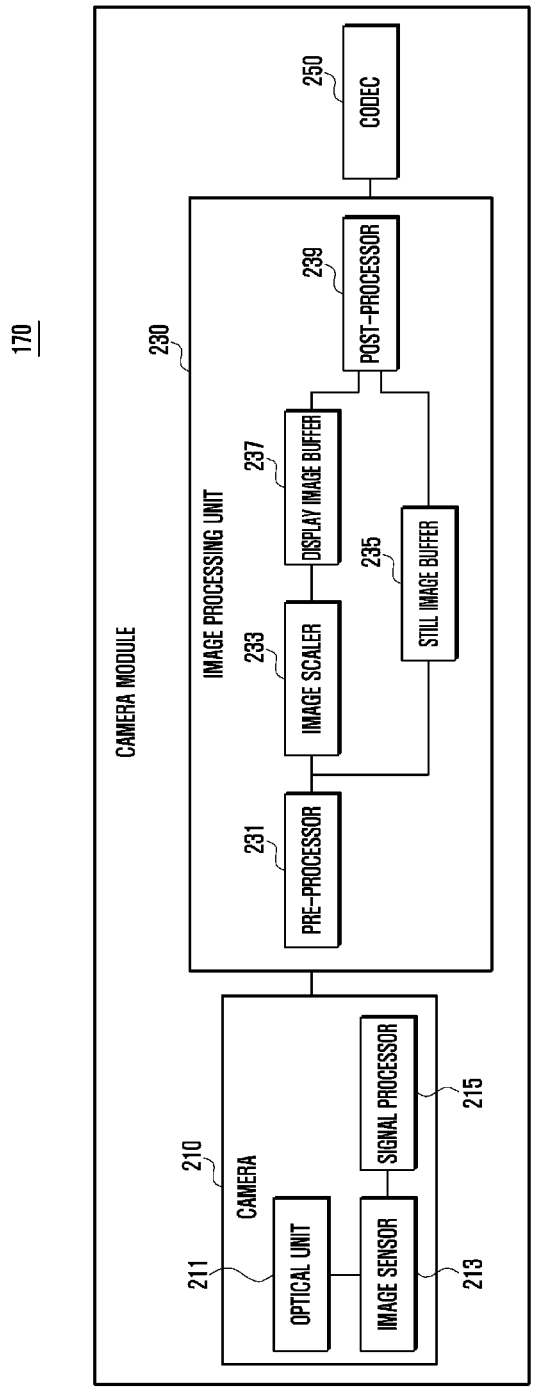
FIG. 2 is a schematic diagram illustrating a configuration of a camera module according to an embodiment of the present disclosure.

FIG. 2 is a schematic diagram illustrating a configuration of a camera module according to an embodiment of the present disclosure.

Referring to FIG. 2, the camera module 170 according to the present disclosure is configured with a camera 210, an image processing unit 230, and a codec 250. All the components illustrated in FIG. 2 may not be essential for the camera module 170 according to the present disclosure, and thereby more or less components can be included in the camera module 170.

The camera 210 performs a function of obtaining an image through an internal sensor when the camera module 170 is activated. The camera 210 may be configured with an optical unit 211, an image sensor 213, and a signal processor 215.

The optical unit 211 may be driven by a mechanical shutter, a motor, and an actuator, and can perform operations of zooming and focusing by using the actuator. The optical unit 211 takes an image, and the image sensor 213 detects the image taken by the optical unit 211 and coverts it to electric signals. Here, the image sensor 213 may be a high resolution image sensor, such as a CMOS sensor or a CCD sensor. Further, the image sensor 213 may be a sensor for detecting an image having an Ultra High Definition (UHD) resolution. The image sensor 213 may integrate a global shutter. The image detected by the image sensor 213 is output by converting to a digital image through the signal processor 215. Here, the signal processor 215 may be an Image Signal Processor (ISP), and the camera 210 may be equipped with a viewfinder.

The image processing unit 230 processes the image generated by the camera 210 by converting to a display image. Further, the image processing unit 230 can convert the image corresponding to a composition used for the display image and a composition used for a still image when a plurality of preview windows are provided corresponding to a plurality of compositions in a preview mode. The image processing unit 230 may be configured with a pre-processor 231, an image scaler 233, a still image buffer 235, a display image buffer 237, and a post-processor 239.

The pre-processor 231 performs a pre-processing function for images obtained by the camera 210. Here, the pre-processing function may include functions of extracting and processing a 3A Auto White Balance (AWB), Auto Exposure (AE), and Auto Focusing (AF), lens shading correction, dead pixel correction, and knee correction.

The image scaler 233 performs a function of scaling a full resolution image output by the pre-processor 231 to an image size used for displaying in the display unit 130. Here, the image scaling may be performed by using at least one of a resizing, a decimation, an interpolation, a crop, a summing and averaging, and the like. The image scaler 233 may be configured with a resizer and/or a summing and averaging unit. More particularly, the image scaler 233 performs a function of image scaling which individually adjusts the sizes of full resolution images output by the pre-processor 231 to the sizes suitable for displaying through a plurality of preview windows having different compositions.

If the image scaler 233 is configured with a resizer, the resizer adjusts the full resolution image output by the pre-processor to an image size and capacity suitable for displaying in the display unit 130. Here, the resizing may be performed by a decimation, an interpolation, and a cropping as described above so that the resized image corresponds to the screen ratio of display unit 130. If the image scaler 233 is configured with a summing and averaging unit, the summing and averaging unit reduces the number of pixels of the image by summing and averaging adjacent pixels of the image.

The still image buffer 235 buffers the full resolution image output by the pre-processor 231. Here, the size of the still image buffer 235 may be set enough for storing a high resolution frame image. The still image buffer 235 buffers the full resolution images output by the pre-processor 231 at every frame, and an image selected according to the control of the control unit 180 may be accessed if capturing the image is requested.

The display image buffer 237 can buffer at least one display image output by the image scaler 233. Here, the display image buffer 237 may perform a function of compensating a time to display the image in the display unit 130.

The post-processor 239 receives a display image and/or a still image output by the display image buffer 237 and/or the still image buffer 235, and generates YUV data by processing the received image with a color interpolation, a noise reduction, and a color correction, and by processing the post-processed image through an image conversion. More specifically, the post-processor 239 may convert the pre-processed image to a YUV image after post-processing with a color interpolation. The post-processor 239 may be configured with a color interpolator, an Image Processing Chain (IPC), an image converter, and the like.

The color interpolator performs a function of converting a received image to a color image. For example, the color interpolator can perform a function of converting pixels of image output by the camera 210 to a Red Green Blue (RGB) format (that is, a full color conversion). The color interpolator performs a color interpolation by using a correlation between adjacent pixels. Generally, processing an image before the color interpolation by the image processing unit 230 may be referred to as pre-processing and processing an image after the color interpolation may be referred to as post-processing.

The IPC performs a noise reduction, a gamma correction, and a luminance correction for the color interpolated image through the color interpolator.

The image converter converts the post-processed image to a YUV image.

The post-processor 239 may process and output an image to the display unit 130 for display in a preview mode. Further, the post-processor 239 can divide a display image and a still image, output the display image to the display unit 130, and output the still image (that is, a full resolution image) to the storage unit 150 after processing the image through the codec 250 in a background. The function of the post-processor 239 may be performed by a software.

As a method of configuring the function of the post-processor 239 with a software, the control unit 180 may select an image to be transmitted to the post-processor 239 by controlling the display image buffer 237 and the still image buffer 235 at every frame section, and control the post-processor 239 to divide images into a display image and a still image. The divided display image may be controlled to be output to the display unit 130 by returning to the preview mode and the correction of the divided image may be processed in a background. Further, the function of post-processing in a background may be loaded into at least one of the storage unit 150 and the control unit 180, or into a separate processor (not shown). According to the embodiment of the present disclosure, a preview application for a preview function (i.e., for displaying an image according to a composition in a multi-preview mode) and a photographing application for photographing in a background may be separately provided. In this case, the preview application and the photographing application may be performed in parallel. If capturing and storing a still image corresponding to a composition selected by a user are not completed until the preview application terminates, the photographing application can be continued in a background until the still image corresponding to the composition selected by the user is captured and stored.

The codec 250 stores a still image output by the image processing unit 230 in the storage unit 150 by compressing and encoding the still image. Here, the codec 250 may be a Joint Photographic Experts Group (JPEG) codec.

Hereinafter, operations of a portable terminal having the above configuration are described.

The control unit 180 controls the operation of the camera module 170 according to a control command input through the input unit 120. More specifically, if a user generates a drive command for the camera module 170 through the input unit 120, the control unit 180 operates in a preview mode by controlling the camera 210 and the image processing unit 230.

More specifically, the control unit 180 drives the camera 210 according to the drive command, and an image output by the camera 210 is transmitted to the pre-processor 231. The pre-processor 231 generates an image at every frame under the control of the control unit 180. Here, a frame rate may be 30 fps (frame per sec) or a higher frame rate (for example, 60 fps). The pre-processor 231 extracts a 3A (AWB, AE, AF) from the frame image, and performs a lens shading correction, a dead pixel correction, and a knee correction. The above pre-processed images is a full resolution image, which is transmitted to the image scaler 233 and still image buffer 235.

The image scaler 233 performs an image scaling for the received full resolution image to display in a size suitable for the display unit 130. More particularly, the image scaler 233 performs the image scaling individually for the received full resolution images in a size suitable for displaying in a preview window provided with a composition in the display unit 130. The image scaling is performed by reducing the number of pixels in the full resolution image obtained by the camera 210 to a size or screen ratio suitable for displaying in the preview windows of the display unit 130. Here, the image scaling can be controlled in various ratios.

As described above, a scaled image is buffered by transmitting to the display image buffer 237. Here, the display image buffer 237 may have a function of adjusting the processing time of a display image. More specifically, the display image buffer 237 can perform a function of buffering a display image of the following frame until the processing of a still image is completed in a capture mode.

The still image buffer 235 buffers a full resolution image output by the pre-processor 231 at every frame. Here, the still image buffer 235 may have a ring buffer structure which can buffer a number of frame images. More specifically, the still image buffer 235 may have N ring buffers storing image data of N frames which can buffer the frame images output by the pre-processor 231 at every frame. For example, the frame image generated at every frame are sequentially buffered from the first buffer of the still image buffer 235, and the first buffer is overwritten if the last buffer is filled with a frame image.

Accordingly, each image obtained by the camera 210 at every frame is buffered in the display image buffer 237 as a display image and in the still image buffer 235 as a still image. Subsequently, the control unit 180 transmits the images stored in the display image buffer 237 and/or the still image buffer 235 at every frame to the post-processor 239. Although an example of operating the display image buffer 237 and the still image buffer 235 separately in the embodiment of the present disclosure, the storage unit 150 may perform the functions of the buffers 235 and 237. Operations of the camera 210 in a preview mode are described below.

As described above, images photographed by the camera 210 at every frame may be formed into a plurality of display images by scaling the full resolution images corresponding to the compositions. The display image buffer 237 buffers the plurality of scaled display images, and the still image buffer 235 buffers the pre-processed full resolution images. The control unit 180 transmits the plurality of display images buffered by the display image buffer 237 to the post-processor 239. The post-processor 239 outputs the plurality of display images (for example, as YUV images) by processing with a color interpolation, an IPC, image converting, and the like. The control unit 180 controls to output the plurality of display images to the display unit 130 and/or the storage unit 150 by accessing them. More particularly, the control unit 180 controls to output the plurality of display images so that the plurality of display images in the display image buffer 237 are displayed in the preview windows having corresponding compositions in a preview mode. More specifically, an image conversion is performed based on the plurality of display images in the display image buffer 237 corresponding to each composition, and the plurality of converted images are controlled to be displayed in the preview windows having corresponding compositions. Operations of the camera 210 in a capture mode are described below.

As described above, if a user requests for capturing a still image through the input unit 120 having an input function in a preview mode, the control unit 180 selects a full resolution still image buffered in the still image buffer 235. If the user requests for capturing a still image having a corresponding composition by selecting a preview window of a specific composition through the input unit 120 or the display unit 130 having an input function in a preview mode, the control unit 180 selects a full resolution image (i.e., a still image) buffered in the still image buffer 235. If the preview windows of a specific composition is selected by switching to a full preview image, the control unit 180 selects a display image buffered in the display image buffer 237 to transmit to the post-processor 239. The display image is processed by the post-processor 239 and displayed in a preview window of the display unit 130 according to a composition selected by the user. If the display image of a specific composition displayed in the display unit 130 is requested by selecting a preview window of a specific composition or by pressing a shutter button, the control unit 180 selects a full resolution image buffered in the still image buffer 235 and transmits the full resolution image to the post-processor 239. The post-processor 239 then processes the full resolution image to a still image according to a composition selected by the user. More specifically, the control unit 180 controls the full resolution image to be captured and stored as a still image according to a composition selected by the user. Here, the still image may be a full resolution image obtained by the camera 210. The control unit 180 processes the still image in a background, reads display images buffered in the display image buffer 237 corresponding to each composition, and controls the post-processor 239 to individually display the images in the preview windows of the display unit 130.

In the embodiment of the present disclosure, if a request for capturing an image is generated through the input unit 120 or the display unit 130 having an input function, the control unit 180 can perform processing of a preview mode and an image correction in parallel. Further, the control unit 180 can display images having different compositions in the display unit 130 by dividing according to compositions of preview windows, and perform a post-processing in a background by selecting a full resolution image captured according to the request from the still image buffer 235. Subsequently, if the image correction is completed, the control unit 180 controls to store the processed full resolution image in a background by encoding the image.

More specifically, the control unit 180 controls the image processing unit 230 to temporarily store a plurality of display images having different compositions in the display image buffer 237, and to temporarily store the full resolution image in the still image buffer 235. The control unit 180 can control the image processing unit 230 in a preview mode to individually output the plurality of display images having different compositions in the display image buffer 237 to the plurality of preview windows having different compositions through the display unit 130. Further, the control unit 180 can control the image processing unit 230 in a capture mode to output the plurality of display images having different compositions in the display image buffer 237 through the display unit 130, and control to store the full resolution image in the still image buffer 235 in the storage unit 150 by performing an image correction in a background, for example, by resizing the images to proper sizes according to the compositions selected by the user.

As described above, the portable terminal may display images having various compositions (for example, a framing mode, a screen ratio, an effect, use, and the like) through preview windows. Further, the portable terminal can perform a conversion of full resolution image in a background corresponding to compositions selected by the user and maintain the preview state of the plurality of display images by returning to the preview mode so that continuous photographing can be performed corresponding to each screen ratio.

Figure 3:
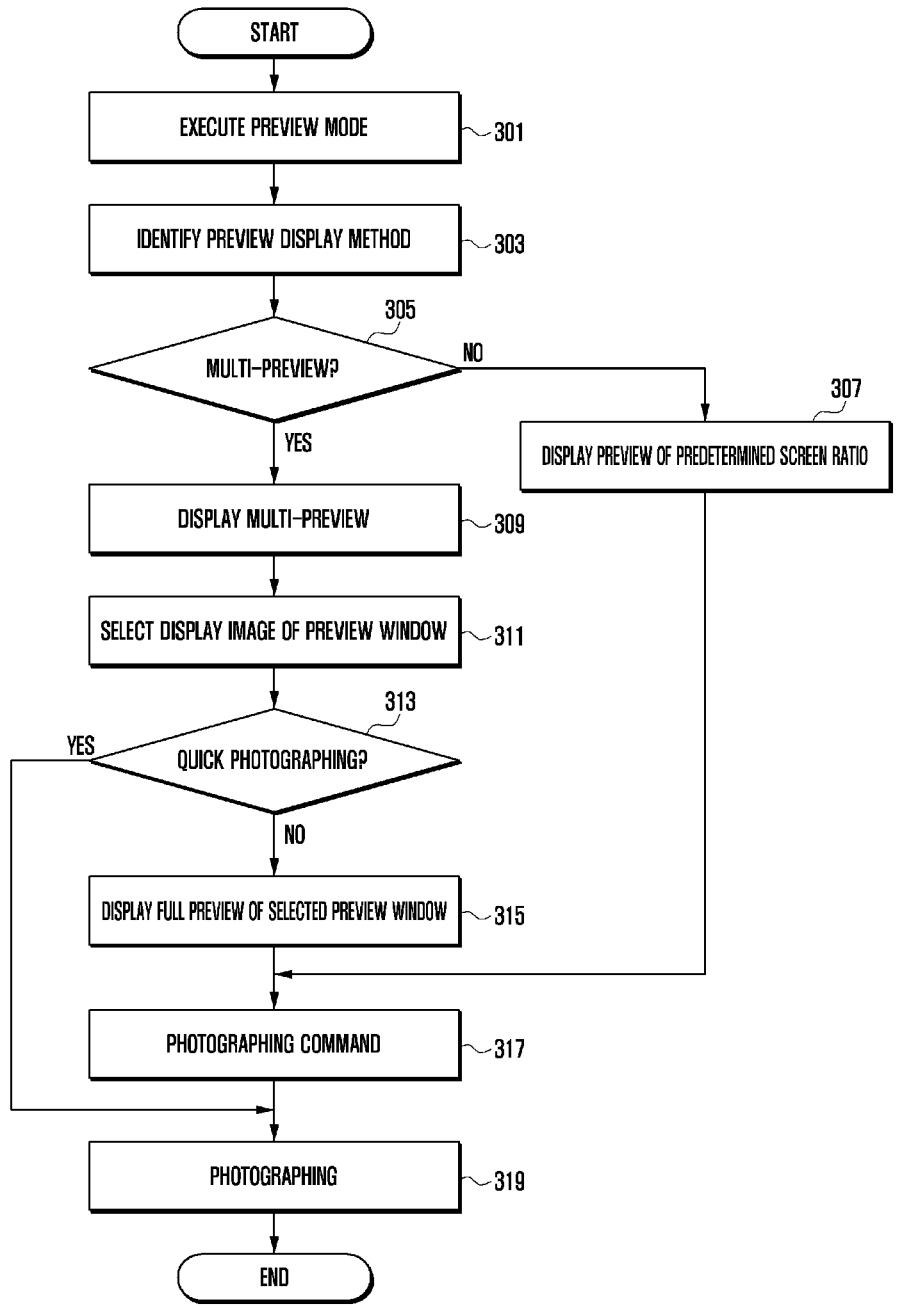
FIG. 3 is a flowchart illustrating a photographing method in a portable terminal according to an embodiment of the present disclosure.

FIG. 3 is a flowchart illustrating a photographing method in a portable terminal according to an embodiment of the present disclosure.

Referring to FIG. 3, the control unit 180 may control the operation of a preview mode corresponding to a user's request at operation 301. For example, if a drive command is generated through the input unit 120 or the display unit 130 having an input function (for example, a touch screen), the control unit 180 drives the camera module 170 and controls the preview mode so that an image obtained by the camera module 170 is processed to be displayed in the display unit 130 as a preview image. Here, the control unit 180 controls to display a preview image in the display image buffer 237 by outputting the image to the display unit 130, and to buffer a full resolution still image in the still image buffer 235.

The control unit 180 identifies a preview display type while executing the preview mode at operation 303. Subsequently, the control unit 180 identifies whether a preview display type is for displaying a multi-preview window displaying a plurality of images having different compositions set by a user (for example, a framing mode, a screen ratio, an effect, use, and the like) or a single preview window displaying an image having a specific composition set by the user or set as default at operation 305.

If the preview display type is a single preview window, the control unit 180 controls to display a preview window in the display unit 130 according to the composition set for the display image at operation 307. More specifically, the control unit 180 may control the preview mode so that an image obtained by the camera module 170 is processed according to a composition and displayed in the display unit 130 as a full preview image.

If a photographing command is received while displaying the preview image at operation 317, the control unit 180 controls photographing based on the composition of the full preview image at operation 319. More specifically, if a photographing command is received in a state that an image having a composition in a single preview is displayed as a full preview, the control unit 180 may obtain a full resolution image (i.e., a still image) buffered in the still image buffer 235, and store the still image corresponding to the composition of the full preview. Here, the control unit 180 may process the photographing operation (that is, capturing and storing an image) operation in a background, and maintain the full preview state corresponding to the composition by returning to the preview mode.

Although not shown in FIG. 3, the control unit 180 may receive a command for switching the single preview window to a multi-preview window from the user while displaying the preview image. The control unit 180 then may switch the single preview window to the multi-preview window, and control the preview mode so that the plurality of display images is output to the display unit 130 corresponding to the plurality of compositions set by the user.

If the preview display type is identified as a multi-preview window at operation 305, the control unit 180 controls the plurality of display images corresponding to the plurality of compositions (for example, a screen ratio) to be individually displayed in the display unit 130 at operation 309. More specifically, the control unit 180 may control the multi-preview mode so that images obtained by the camera module 170 are processed according to the plurality of compositions and individually displayed in the preview windows having different compositions.

In the state of displaying the plurality of images corresponding to the plurality of compositions in the preview windows, the control unit 180 may receive an input for selecting a display image of a specific configuration from the user at operation 311. More specifically, the control unit 180 may detect a user's input of selecting a preview window of a specific composition from the preview windows of compositions provided through the display unit 130.

If an input for selecting a display image of a specific composition is received, the control unit 180 identifies whether the photographing mode is set to a full preview switching at operation 313. More specifically, if a display image of a specific composition is selected in the state of displaying the multi-preview window, the control unit 180 can identify whether the photographing mode is a quick photographing mode for directly capturing and storing an image of corresponding composition or a preview switching displaying an image of a specific composition selected by the user in a full preview window.

If the photographing mode is a quick photographing mode at operation 313, the control unit 180 controls the photographing operation based on the composition selected by the user at operation 319. More specifically, if an input for selecting an image of a specific composition is received in the quick photographing mode, the control unit 180 can obtain a full resolution image (i.e., a still image) buffered in the still image buffer 235 and store the still image corresponding to the composition selected by the user. Here, the control unit 180 can process the photographing operation in a background and maintain the display state of preview windows having different compositions in the display unit 130.

If the photographing mode is not a quick photographing mode at operation 313, the control unit 180 controls the image having a composition selected by the user to be displayed as a full preview at operation 315. For example, the control unit 180 obtains the display image having a composition selected by the user from the display image buffer 237 and may control the preview switching so that the obtained image is displayed in a full preview window according to the composition selected by the user.

The control unit 180 may receive a photographing command in the state of displaying the full preview at operation 317. For example, the user may input the photographing command by pressing a shutter button through the input unit 120 or the display unit 130 having an input function.

If the photographing command is received, the control unit 180 controls the photographing based on the composition of the preview window at operation 319. More specifically, if the photographing command is received in the state of displaying the image having a specific composition as a full preview, the control unit 180 may obtain a full resolution image (i.e., a still image) buffered in the still image buffer 235 and store the still image by capturing according to the composition of the full preview window or a composition selected by the user. Here, the control unit 18 may process the photographing operation in a background, and return to the preview mode so that the still image is displayed by switching to a preview window having a different composition in the display unit 130.

Hereinafter, an operating method in a multi-preview mode of the portable terminal according to an embodiment of the present disclosure is described referring to screen illustrations of the accompanying drawings. Images having various compositions (for example, a screen ratio, a framing mode, an effect, use, and the like) are displayed through a plurality of preview windows in a multi-preview mode. The screen configuration and operating method in the portable terminal are not limited to the following technical contents, and it should be understood that the following various embodiments can be applied to other various embodiments.

Figure 4:
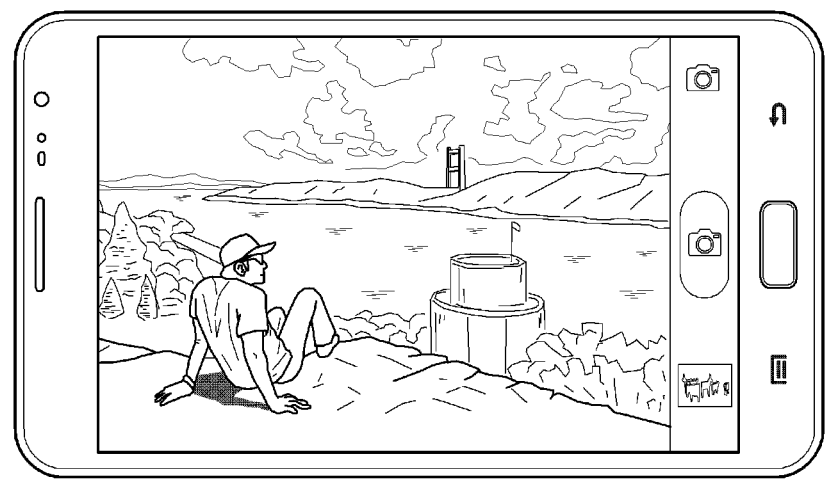
FIGS. 4, 5, and 6 illustrate a preview mode in a portable terminal according to an embodiment of the present disclosure.
Figure 5:
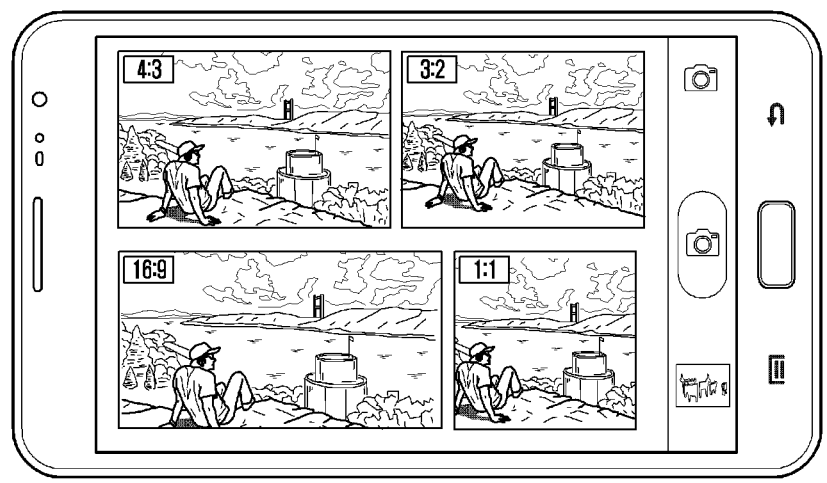
Figure 6:
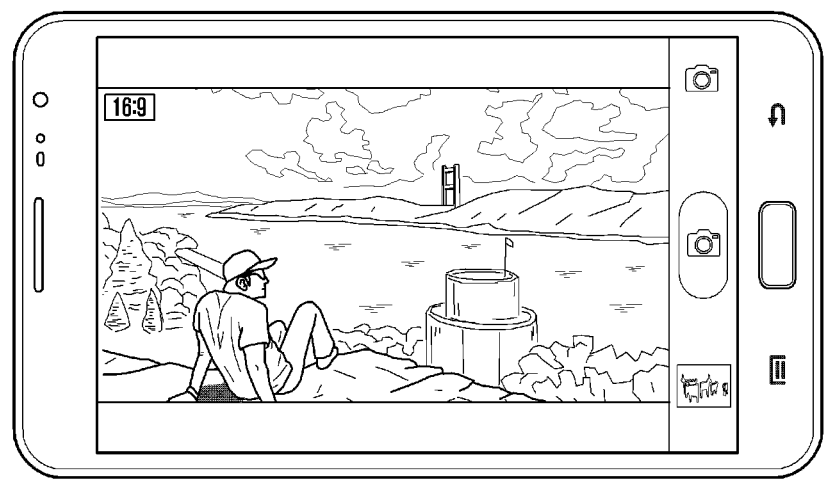

FIGS. 4, 5, and 6 illustrate a preview mode in a portable terminal according to an embodiment of the present disclosure.

FIG. 4 illustrates a screen example of displaying an image in a preview window when the preview mode operates as a basic preview mode corresponding to a screen ratio (or screen size). FIG. 5 illustrates a screen example of displaying a plurality of images in each preview window corresponding to screen ratios when the preview mode operates as a multi-preview mode. FIG. 6 illustrates a screen example of displaying an image corresponding to a screen ratio set by a user when the preview mode operates as a single preview mode.

Referring to FIG. 4, if a user drives the camera module 170 by inputting a command through the input unit 120 or the display unit 130 having an input function in the basic preview mode, an image is displayed in a preview window corresponding to the screen ratio (or screen size) of the display unit 130.

Referring to FIG. 5, if the user drives the camera module 170 by inputting a command through the input unit 120 or the display unit 130 having an input function in the multi-preview mode, images are displayed in the preview windows having a plurality of screen ratios selected from various screen ratios supported by the portable terminal.

Here, the number of preview windows displayed in the display unit 130 may be determined according to user settings. Although FIG. 5 shows 4 preview windows respectively having 4 screen ratios (that is, 4:3, 3:2, 16:9, and 1:1), the preview windows may be configured according to the screen ratios set by the user, such as 2, 3, 5, and 6.

If the number of screen ratios set by the user is greater than the number of preview windows displayed in the screen of the display unit 130, not displayed preview windows having different screen ratios can also be provided. For example, if the number of screen ratios set by the user is 6 and the number of preview windows configured in the screen is 4, 4 preview windows corresponding 4 screen ratios are displayed as shown in FIG. 4 and the remaining 2 preview windows can be displayed in the screen by a user's scroll control.

Further, composition information of screen ratios set by the user may be provided through the preview windows as shown in FIG. 5. For example, the screen ratios (for example, 4:3, 3:2, 16:9, and 1:1) in each preview window may be indicated with a specific item, such as a text and an icon.

In the present disclosure, the preview windows may be provided in a plurality of layers, and images are displayed on the layers by processing a layout corresponding to the preview windows in a transparent or perforated form. The size and location of the preview window may vary according to the compositions (for example, a screen ratio, a framing mode, an effect, a complex composition, and the like) for the operation of the multi-preview mode.

In the basic preview mode, all the images are displayed in the preview windows by processing the preview layers in a transparent form. In the single preview mode, the preview layer is processed in a transparent form corresponding to the compositions (for example, a screen ratio, and a framing mode) and images are displayed in a full preview window according to the compositions. In the multi-preview mode, a preview layer is divided into a plurality of preview layouts, and images are displayed according to the compositions by processing the preview layouts in a transparent form.

Referring to FIG. 6, if the user drives the camera module 170 by inputting a command through the input unit 120 or the display unit 130 having an input function in the single preview mode, a preview image may be displayed corresponding to a specific screen ratio set by the user.

Referring to FIG. 6, the composition information of screen ratios set by the user may be provided through the full preview window. For example, the screen ratio (for example, 16:9) corresponding to the full preview window may be indicated with a specific item, such as a text and an icon.

Figure 7:
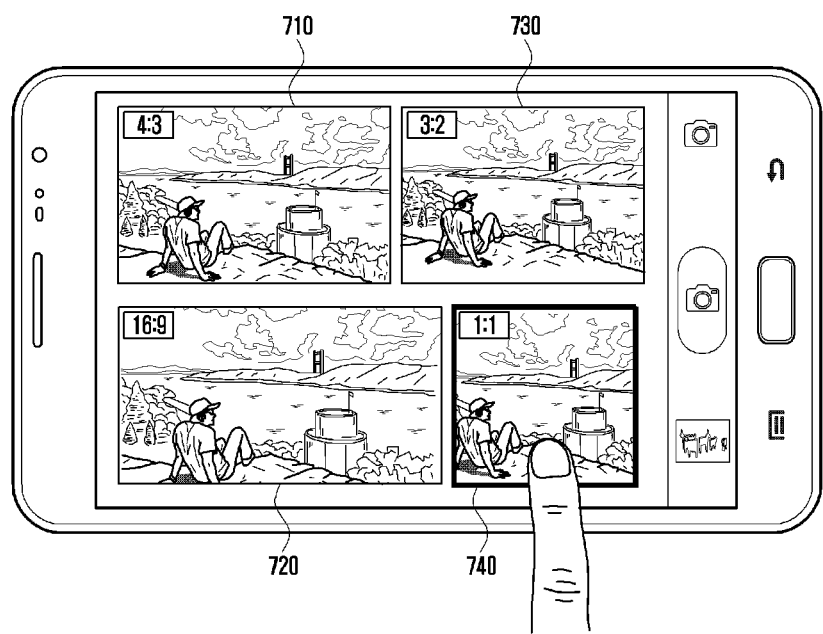
FIG. 7 illustrates a preview mode of a multi-preview mode provided by a portable terminal according to an embodiment of the present disclosure.

FIG. 7 illustrates a preview mode of a multi-preview mode provided by a portable terminal according to an embodiment of the present disclosure.

FIG. 7 illustrates an example of performing a photographing function by using preview windows having a specific screen ratio in the multi-preview mode similar to that of FIG. 5.

Referring to FIG. 7, a user may select a preview window having a desired screen ratio in the state of displaying a plurality of preview windows 710, 720, 730, and 740 corresponding to a plurality of screen ratios in the multi-preview mode. If an input for selecting the preview window 740 is received, the control unit 180 may control operations of full preview switching, quick photographing, or multi-photographing according to setting information determined by the user.

Further, if the preview window 740 having a specific screen ratio is selected, the control unit 180 can feed back to the user that the preview window 740 is selected according to the user's selection. Here, the feedback may be output by using at least one of an acoustic sense (sound), a visual sense (that is, focusing and highlighting), and a tactile sense (vibration).

For example, if the user selects the preview window 740 from the plurality of preview windows 710, 720, 730, and 740 corresponding to the plurality of screen ratios in the state that the full preview switching is set by the user, the preview display of multi-preview mode is switched to a full preview window corresponding to the screen ratio of the selected preview window. The image of preview window may be displayed as a full preview image according to the screen ratio as shown in FIG. 6. More specifically, the screen of the portable terminal shown in FIG. 7 may be switched to FIG. 6 according to the preview windows having a specific screen ratio selected by the user.

The user may switch the full preview window back to the previous state (i.e., a display state of preview windows according to the multi-preview mode). Further, the user may perform a photographing operation by inputting a photographing command (for example, by touching a shutter button) in the state of displaying the full preview window. Here, the full preview state may be maintained or switched to the multi-preview mode according to the user's selection while performing the photographing in the state of displaying the full display windows.

Further, if a preview window is selected from the plurality of preview windows 710, 720, 730, and 740 corresponding to the plurality of screen ratios in the quick photographing set by the user as shown in FIG. 7, the full resolution image (i.e., a still image) buffered in the still image buffer 235 is captured and stored according to the screen ratio set by the user. Here, the preview display state of preview windows is maintained, and the photographing operation is performed in a background. Accordingly, the user can perform a continuous photographing operation according to each screen ratio. For example, the user may select the preview window 740, and another preview window in sequence as shown in FIG. 7. The control unit 180 may control the continuous photographing according to the screen ratios sequentially selected by the user.

The user may select another preview window having a different screen ratio after selecting a preview screen from the plurality of preview windows 710, 720, 730, and 740 corresponding to the plurality of screen ratios in the multi-photographing set by the user as shown in FIG. 7. Here, the user may select a plurality of preview windows.

If the user selects the preview window 740, the control unit 180 maintains the preview state of the multi-preview mode and feeds back to the user that the corresponding preview window is selected. The control unit 180 may control an output of additional feedback if the user selects another preview window after selecting the preview window 740. For example, if the user selects the preview windows 710, 720, and 740 corresponding to 3 different screen ratios, the control unit 180 may feed back to the user that the 3 preview windows 710, 720, and 740 are selected. If the user touches or taps again the selected preview window, the selection of the corresponding preview window is disabled.

If the user inputs a photographing command in the state of selecting the plurality of preview windows, photographing of images corresponding to the plurality of selected screen ratios can be performed. The control unit 180 controls to capture and store the full resolution images (i.e., still images) buffered in the still image buffer 235 according to the plurality of screen ratios selected by the user. More specifically, the control unit 180 can generate a plurality of photographing data corresponding to the plurality of screen ratio selected by the user. When performing the photographing according to the plurality of screen ratios, the display state of preview windows having different screen ratios may be maintained, and the photographing operation can be performed in a background. Here, the selection of the preview windows (for example, focusing and highlighting) may be disabled or enabled.

Figure 8:
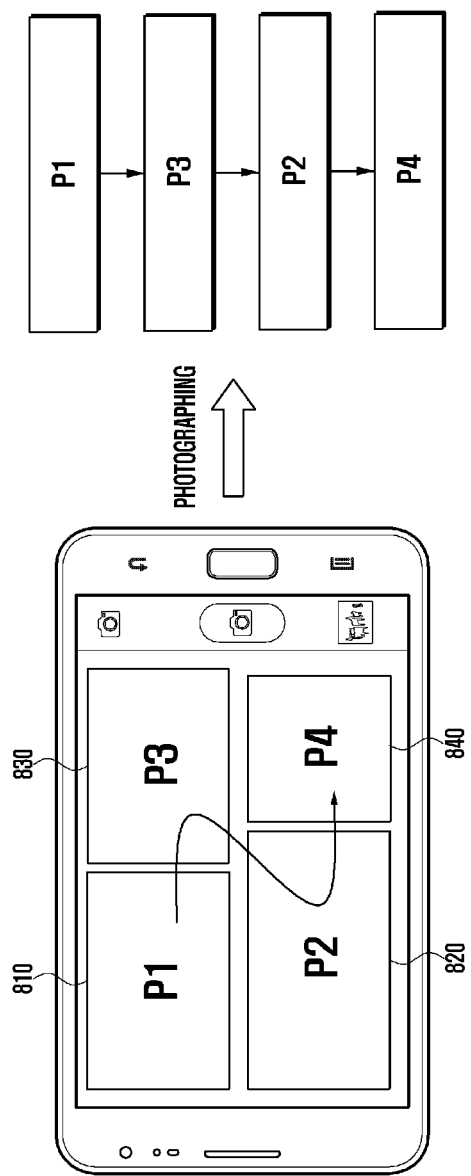
FIGS. 8 and 9 illustrate a photographing operation in a multi-preview mode of a portable terminal according to an embodiment of the present disclosure.
Figure 9:
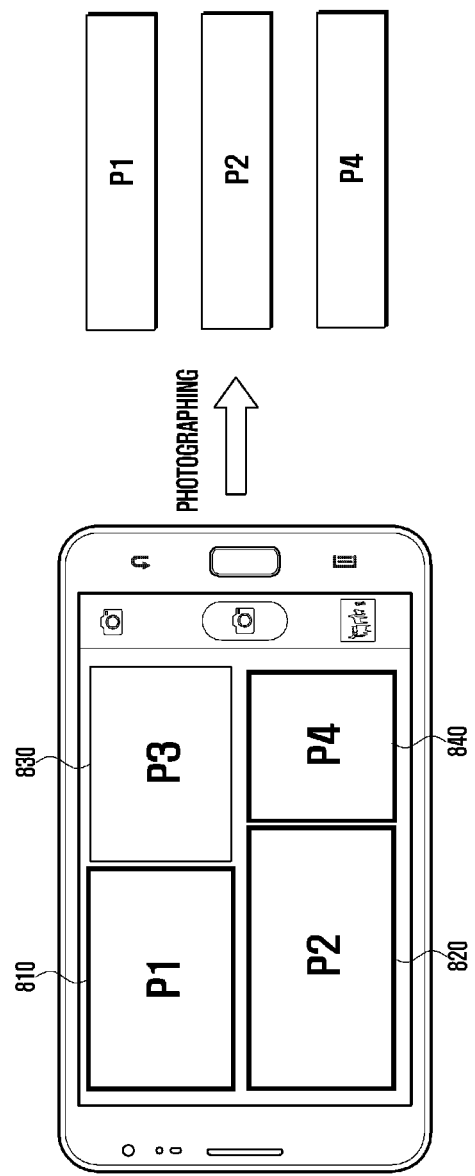

FIGS. 8 and 9 illustrate a photographing operation in a multi-preview mode of a portable terminal according to an embodiment of the present disclosure.

FIG. 8 illustrates an operation of continuous photographing in the multi-preview mode, and FIG. 9 illustrates an operation of multi-photographing in the multi-preview mode.

Referring to FIG. 8, in a multi-preview mode in which a quick photographing is set and preview windows corresponding to 4 screen ratios (for example, 4:3, 3:2, 16:9, and 1:1) are displayed, the user may sequentially select a preview window P1 (810), a preview window P3 (830), a preview window P2 (820), and a preview window P4 (840).

The control unit 180 then performs a photographing operation using a full resolution image buffered in the still image buffer 235 corresponding to the order of screen ratios selected by the user. More specifically, the control unit 180 can perform a continuous photographing corresponding to the user inputs for selecting preview windows. Here, the control unit 180 can perform the photographing according to the screen ratios of preview windows at each time of selecting a preview window. Accordingly, the photographing data generated according to the photographing command can be captured and stored in the sequence of P1, P3, P2, and P4 according to the inputs of selecting preview windows by the user and corresponding to the screen ratios.

Referring to FIG. 9, in a multi-preview mode in which a quick photographing is set and preview windows corresponding to 4 screen ratios (for example, 4:3, 3:2, 16:9, and 1:1) are displayed, the user may randomly select a preview window from the preview window P1 810, the preview window P2 820, the preview window P3 830, and the preview window P4 840. After selecting a plurality of preview windows (for example, 810, 820, and 840), the user may input a photographing command by touching or tapping a shutter button.

The control unit 180 then performs a random photographing operation using a full resolution image buffered in the still image buffer 235 corresponding to the screen ratios selected by the user. More specifically, the control unit 180 can perform a photographing operation for a plurality of selected screen ratios regardless of the order of user inputs for selecting preview windows. Here, the photographing may be performed in a method of randomly photographing corresponding to each screen ratio or in a method of photographing corresponding to the selected screen ratios at once. Accordingly, the photographing data generated according to the photographing command may be randomly or simultaneously captured and stored corresponding to the 3 screen ratios selected by the user.

Figure 10:
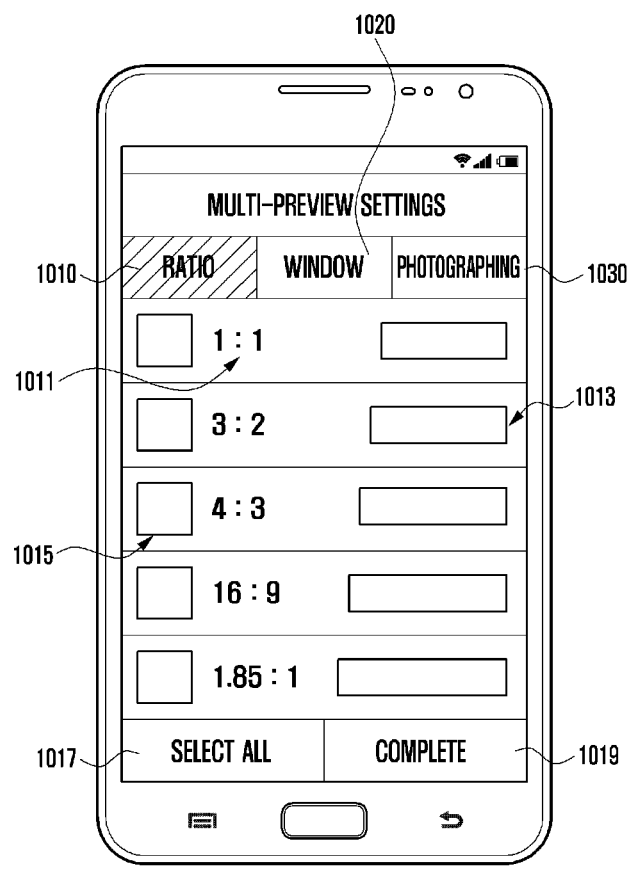
FIGS. 10, 11, and 12 illustrate a multi-preview setting interface in a portable terminal according to an embodiment of the present disclosure.
Figure 11:
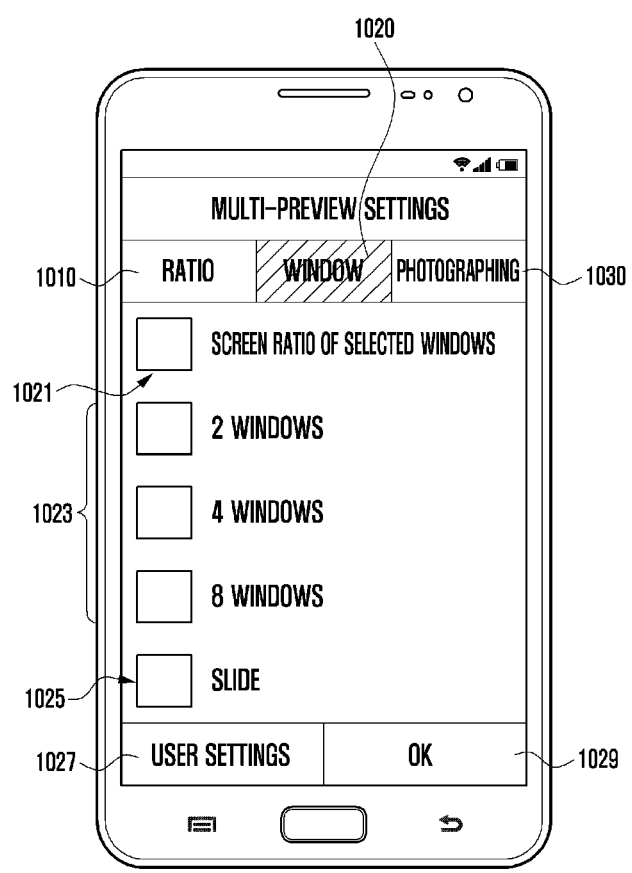
Figure 12:
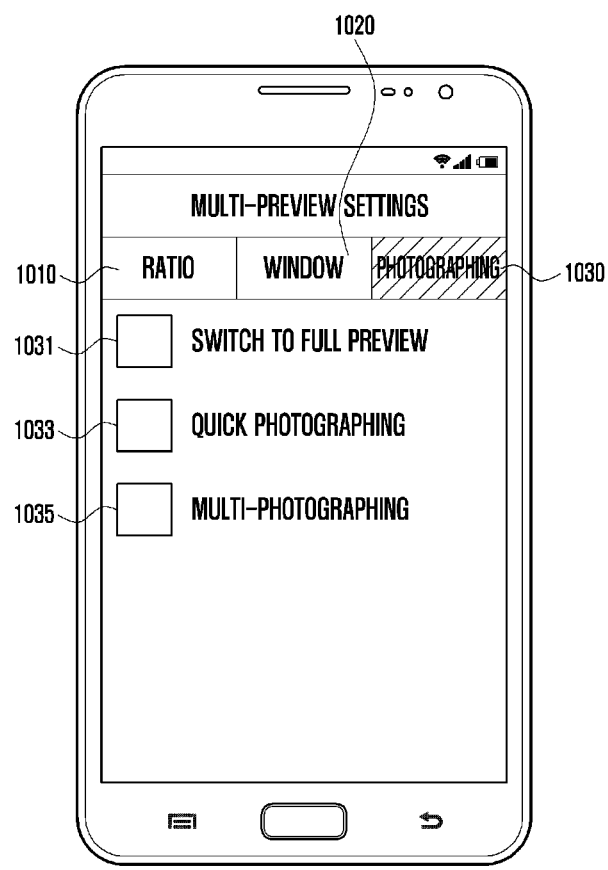

FIGS. 10, 11, and 12 illustrate a multi-preview setting interface in a portable terminal according to an embodiment of the present disclosure.

FIG. 10 illustrates a screen example of selecting a ratio tab 1010 for setting a screen ratio in the multi-preview setting interface. FIG. 11 illustrates a screen example of selecting a window tab 1020 for configuring a preview window in the multi-preview setting interface. FIG. 12 illustrates a screen example of selecting a photographing tab 1030 for setting a photographing mode in the multi-preview setting interface.

Referring to FIG. 10, the multi-preview setting interface may display a ratio setting interface for setting a screen ratio by selecting a ratio tab 1010.

The ratio setting interface provides a list displaying all the screen ratios stored in the portable terminal, and a text 1011 and a screen example item 1013 may be provided for each screen ratio. A check box 1015 may be provided so that a user can select a desired screen ratio. Further, the ratio setting interface may provide a select all button 1017 for selecting all the screen ratios in a lump and a complete button 1019 for completing the screen ratio settings. The user may select and set at least one screen ratio to be used for the multi-preview mode through the ratio setting interface. Although not shown in FIG. 10, the user may select the display order (or arrangement) of a plurality of screen ratios to be selected.

Referring to FIG. 11, the multi-preview setting interface may display a window setting interface for setting a preview window by selecting a window tab 1020.

The window setting interface provides a list of items for setting an arrangement structure disposing preview windows according to the screen ratios selected by a user. The ratio setting interface may include an item 1021 for displaying all the preview windows of screen ratios selected by the user in a screen, an item 1023 for displaying the preview windows of screen ratios selected by the user in at least one screen according to a number of preview windows (for example, 2, 4, and 8 windows), and an item 1025 for sequentially displaying all the preview windows of screen ratios selected by the user as a slide show. Further, the window setting interface may include a user settings button 1027 for setting an arrangement structure according to the user's decision and a complete button 1029 for completing the settings of window configuration according to the user's selection. The user may set a display method for at least one screen ratio to be indicated in the multi-preview mode (i.e., an arrangement structure of preview windows having each screen ratio) through the window setting interface.

Referring to FIG. 12, the multi-preview setting interface may display a photographing setting interface for setting a photographing mode by selecting a photographing tab 1030.

The photographing setting interface may include a full preview switching item 1031 for performing a photographing operation according to a user's photographing command after switching to a full preview window having a corresponding screen ratio, if a preview window is selected in the multi-preview mode, a quick photographing item 1033 for performing a direct photographing based on the screen ratio of the selected preview window, and a multi-photographing item 1035 for performing a multi-photographing according to a user's photographing command after selecting at least one screen ratio of preview window from all the screen ratios provided in the multi-preview mode. Therefore, through the photographing setting interface, the user may set a photographing method by selecting preview windows of each screen ratio in a multi-preview mode configured according to the ratio setting interface and window setting interface.

Figure 13:
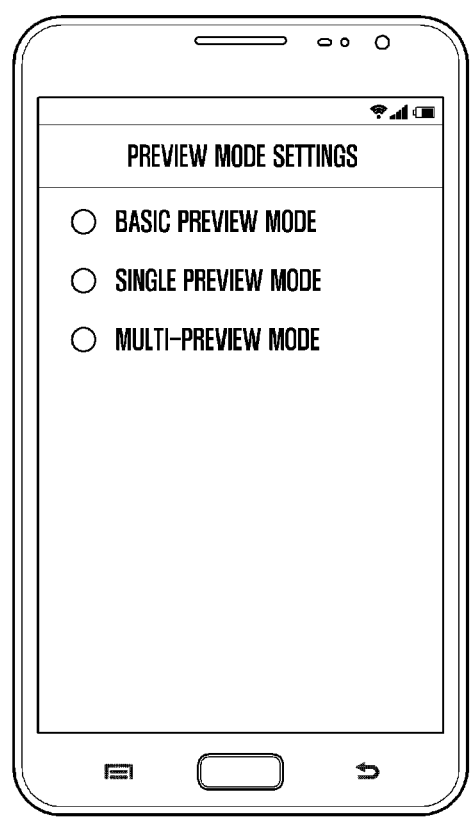
FIG. 13 illustrates an interface for setting a preview mode according to an embodiment of the present disclosure.

FIG. 13 illustrates an interface for setting a preview mode according to an embodiment of the present disclosure.

FIG. 13 illustrates an example of preview setting interface having an upper level depth for entering the multi-preview setting interface described in FIGS. 10, 11, and 12.

Referring to FIG. 13, the preview setting interface may include selection items for a basic preview mode, a single preview mode, and a multi-preview mode. More specifically, a user may select a basic preview mode, a single preview mode, or a multi-preview mode in the preview setting interface as an operating method of a preview mode.

If one of the above modes is selected, the user can perform more settings of the corresponding mode by switching to a lower level depth. For example, the user may switch to the multi-preview setting interface by selecting the multi-preview mode as shown in FIGS. 11 and 12. Alternatively, the user may select the single preview mode and set a screen ratio to be applied in the single preview mode by switching to the ratio setting interface as shown in FIG. 10.

Although not shown in FIG. 13, the user may enter a lower level depth for setting a type of multi-preview mode to be applied when the multi-preview mode is selected. For example, if the user selects an item of the multi-preview mode in the preview setting interface as shown in FIG. 13, the portable terminal may provide an interface for selecting one of a multi-screen ratio preview mode, a multi-effect preview mode, a multi-framing preview mode, a preview mode of a complex composition, and the like. Therefore, the user can perform settings after selecting a type of multi-preview mode.

Figure 14:
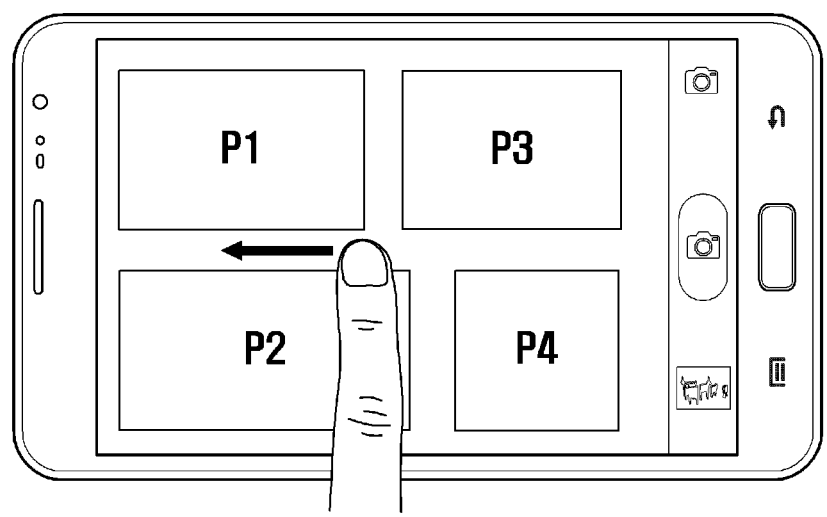
FIGS. 14, 15, and 16 illustrate a scroll control operation in a multi-preview mode of a portable terminal according to an embodiment of the present disclosure.
Figure 15:
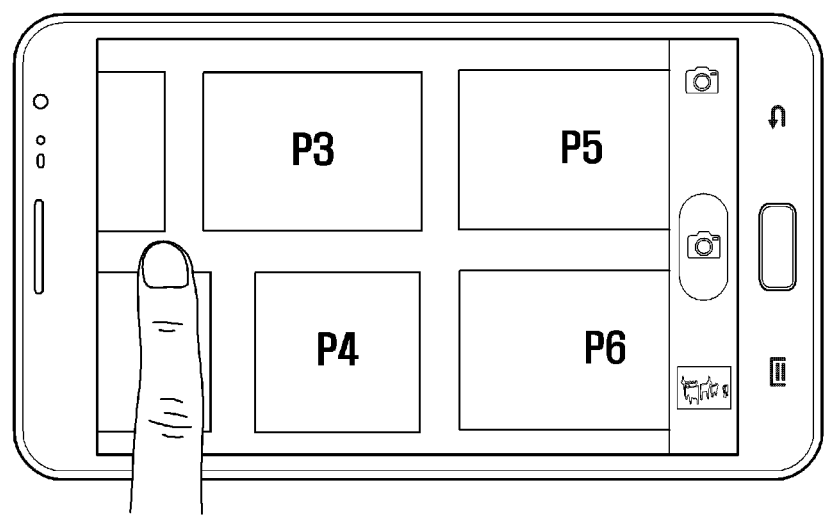
Figure 16:
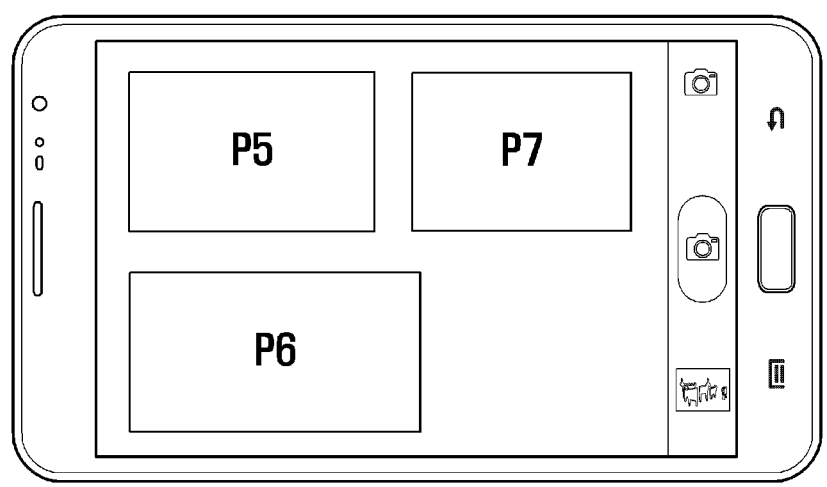

FIGS. 14, 15, and 16 illustrate a scroll control operation in a multi-preview mode of a portable terminal according to an embodiment of the present disclosure.

FIG. 14 illustrates a screen example of the portable terminal while displaying preview windows corresponding to a plurality of screen ratios in an arrangement structure set by a user in a multi-preview mode. For example, the user may select 7 screen ratios in the setting of the multi-preview mode, and set so that 4 preview windows having different screen ratios are displayed in a screen. FIG. 15 illustrates a screen example of displaying 4 preview windows P1, P2, P3, and P4 corresponding to 4 screen ratios among the 7 screen ratios set by the user in the multi-preview mode.

Referring to FIG. 14, the user may touch an area of the screen in the state of preview windows are displayed in the multi-preview mode, and input a gesture (for example, a touch, a drag, and the like) moving towards the left direction while maintaining the touch state. In the embodiment of the present disclosure, a method of controlling a scroll by a touch and drag input method has been described, however the scroll control may also be performed by a flick input method or a sweep input method.

Responding to the user input for controlling a scroll, the portable terminal moves the preview screens to the left side, and changes the displayed preview windows accordingly. More specifically, FIG. 15 illustrates a screen example of sliding the preview screens corresponding to the movement of the user input according to the scroll control.

Referring to FIG. 15, while maintaining the user input, preview windows P1, P2, P3, and P4 of the previous screen may be partially displayed, and 3 preview windows P5, P6, and P7 of the remaining 3 screen ratio may be partially displayed depending on the distance of movement.

The user may release the input (i.e., a touch, a drag state, and the like) from the displayed screen. For example, the user may continue to move the touch to the left side and release the touch when reaching to the edge of the screen.

If the user input is released, the portable terminal displays a screen of FIG. 16. More specifically, the screen of the portable terminal shown in FIG. 15 is switched to the screen of FIG. 16 according to the release of user input.

Referring to FIG. 16, 3 preview windows P5, P6, and P7 of the remaining 3 screen ratio from the 7 screen ratios set by the user may be displayed by excluding the previously displayed preview windows. In the examples of FIGS. 14, 15, and 16, it has been assumed that 4 preview windows are disposed in a screen, and thereby 4 preview windows can be provided in the new screen. The preview windows having 4 screen ratios selected from the 7 screen ratios by the user have been provided in the previous screen, and the remaining screen ratios are 3. Therefore, 3 preview screens P5, P6, and P7 corresponding to the remaining 3 screen ratios can be displayed in the following screen by switching the screens as shown in FIG. 16.

Figure 17:
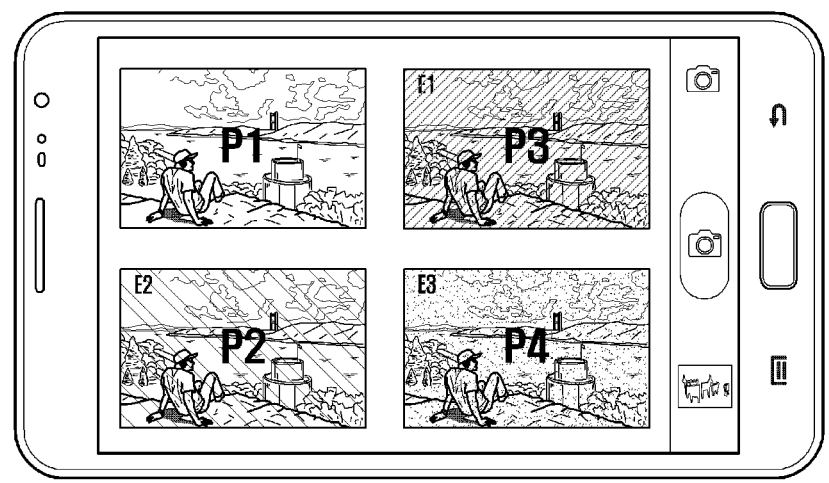
FIG. 17 illustrates a multi-effect preview mode in a portable terminal according to an embodiment of the present disclosure.

FIG. 17 illustrates a multi-effect preview mode in a portable terminal according to an embodiment of the present disclosure.

FIG. 17 illustrates a screen example of displaying images according to a plurality of effects set by a user.

Referring to FIG. 17, if the user drives the camera module 170 by inputting a command through the input unit 120 or the display unit 130 having an input function in the multi-effect preview mode, preview images applied with a plurality of effects selected from various effect supported by the portable terminal (or all the effects supported by the portable terminal) may be displayed in the preview windows. Here, the number of preview windows displayed in the display unit 130 may be variously determined by the user.

Although 4 preview windows corresponding to 4 effects (for example, an original image, an effect 1 (i.e., a sketch), an effect 2 (i.e., a black and white effect), an effect 3 (pastel)) are shown in FIG. 17, the preview windows may be variously provided according to the user's setting, such as 2 windows, 3 windows, 5 windows, 6 windows, and windows including all the set effects.

If the number of effects set by the user is greater than the number of preview windows displayed in a screen, preview windows not displayed in the screen may be shown through a screen switching. For example, if the number of effects set by the user is 7 and the number of preview windows displayed in the screen is 4, preview windows corresponding to 4 effects are displayed as shown in FIG. 17, and preview windows corresponding to the remaining 3 effects may appear in the screen by a user's scroll control.

Further, in the state of displaying a plurality of preview windows (for example, P1, P2, P3, and P4) corresponding to a plurality of effects in the multi-effect preview mode, the user may perform a photographing operation according to the method described referring to FIGS. 7, 8, and 9. For example, the user may perform the photographing operation by selecting at least one preview window, switching to a full preview, and using an operation selected from a photographing mode, a quick photographing mode, and a multi-photographing mode.

FIGS. 18, 19, 20, 21, and 22 illustrate an interface for setting a multi-preview mode in a portable terminal according to an embodiment of the present disclosure.

FIGS. 18, 19, 20, 21, and 22 illustrate an example of a multi-effect preview setting interface for the multi-effect preview mode, in which preview windows are configured and the effects set by the user are applied to the preview windows. However, the setting interface for the multi-effect preview mode may be performed by the same method as that of FIGS. 10, 11, and 12. More specifically, the user may select desired effects first, set the preview windows to be configured in a screen, and set a photographing method accordingly.

Figure 18:
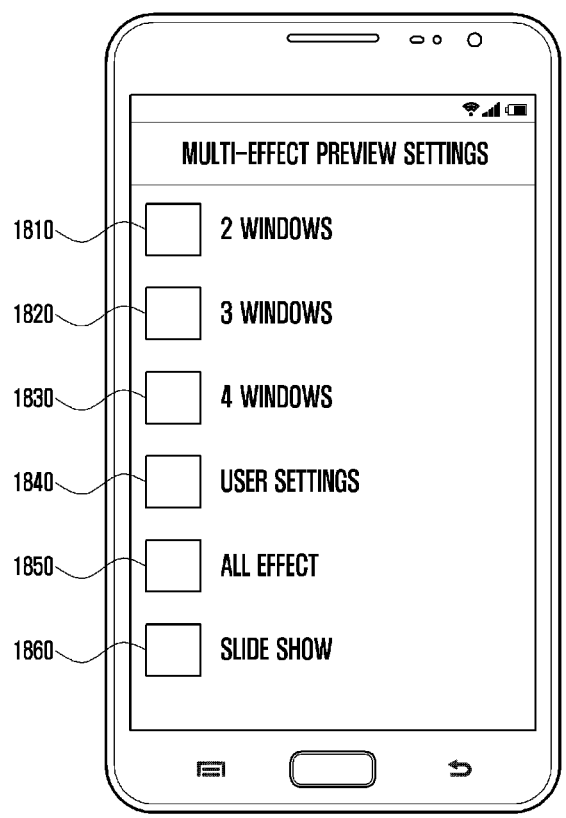
FIGS. 18, 19, 20, 21, and 22 illustrate an interface for setting a multi-preview mode in a portable terminal according to an embodiment of the present disclosure.

FIG. 18 illustrates a screen example for configuring preview windows in the multi-effect preview setting interface. FIGS. 19, 20, 21, and 22 are screen illustrations for setting an effect of each preview window configured by the user in the multi-effect preview setting interface.

Referring to FIG. 18, items for setting the arrangement of preview windows in a screen corresponding to a plurality of effects are displayed as a list in the multi-preview setting interface. More specifically, the multi-preview setting interface may include items 1810, 1820, and 1830 for setting the number of preview windows to be displayed in a screen, an item 1840 for setting the number of preview windows to be displayed in the screen by a user, an item 1850 for setting a random display of preview windows in a screen by using all the effects set by the user, and an item 1860 for setting a slide show of sequentially displaying preview windows by using all the effects set by the user. Therefore, the user may set a method for displaying at least one effect in the multi-preview mode, i.e., an arrangement structure of preview windows for each effect, through the setting in the multi-preview setting interface.

Figure 19:
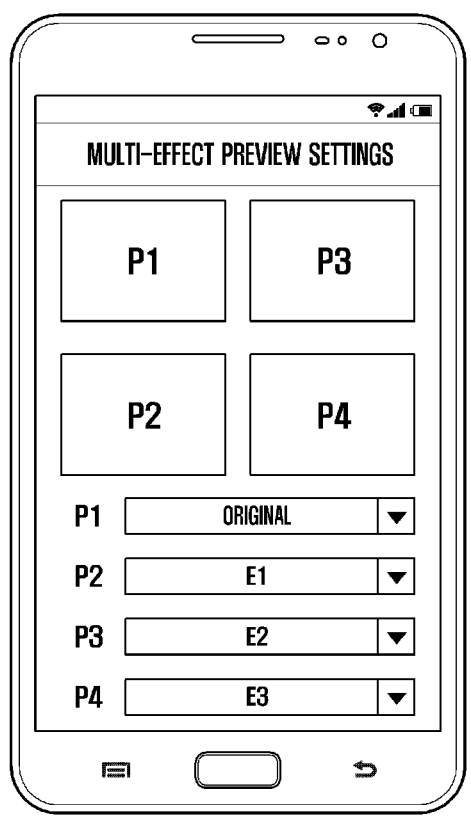
Figure 20:
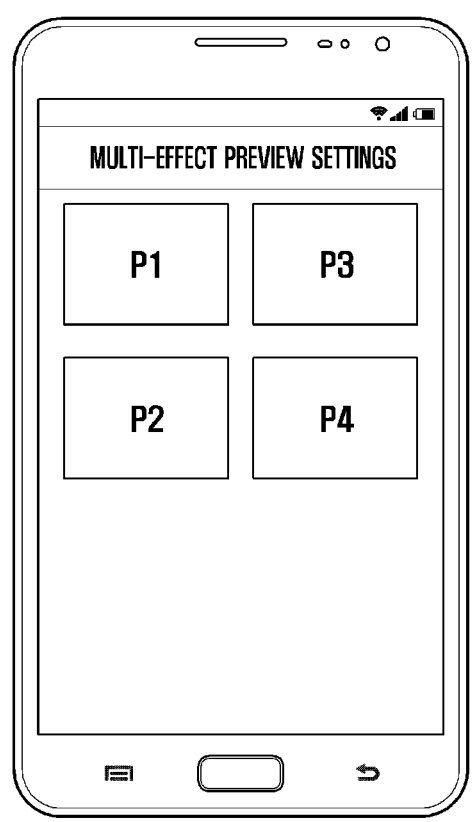
Figure 22:
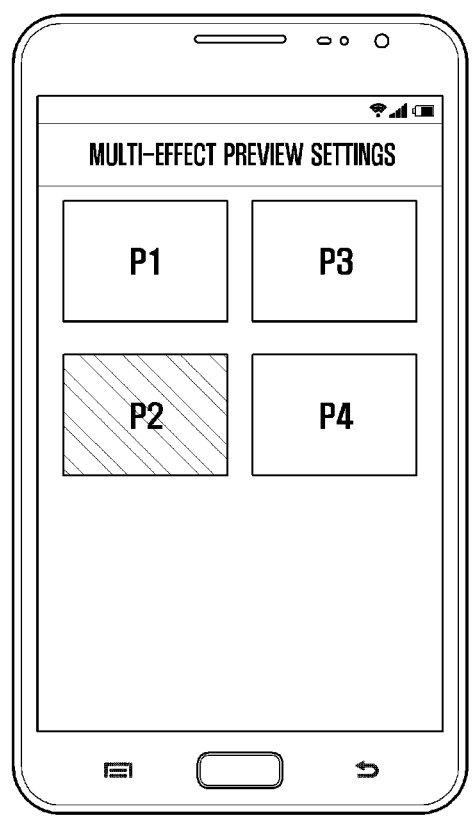

According to the embodiment of the present disclosure, the method for setting an effect of each preview window configured in FIG. 18 may be performed through the interfaces shown in FIGS. 19, 20, and 22.

FIG. 19 illustrates a screen example output by the portable terminal when the user requests for setting each preview window after configuring 4 windows in the interface shown in FIG. 18. More specifically, a display state of 4 preview windows P1, P2, P3, and P4 according to the 4 effects set by the user is shown in FIG. 19 while executing the multi-preview mode.

Referring to FIG. 19, preview windows set by the user may be disposed at the upper part of the interface, and drop-down menus or a pull-down menu for setting the preview windows displayed at the upper part of the interface may be disposed at the lower part of the interface. The drop-down menu indicates a menu style for expanding a menu downward at the selected location if a menu bar or an open button (i.e., an inverted triangle button) is selected.

Accordingly, the user may set effects of each preview window in the drop-down menus provided for each preview window displayed at the upper area. As shown in FIG. 19, the user may set the preview window P1 for an original image not applied with any effect, a preview window P2 for an effect 1 (E1: a sketch), a preview window P3 for an effect 3 (E2: black and white), and a preview window P4 for an effect 3 (E3: pastel).

FIG. 20 illustrates a screen example displayed by the portable terminal when the user requests for setting effects of each preview window after setting the number of preview windows to 4 as shown in FIG. 18. More specifically, FIG. 20 is a screen example of 4 preview windows P1, P2, P3, and P4 set according to 4 effects set by the user through the interface while executing the multi-preview mode. Further, the user may select one of preview windows P1, P2, P3, and P4, and set the preview window with a corresponding effect.

Figure 21:
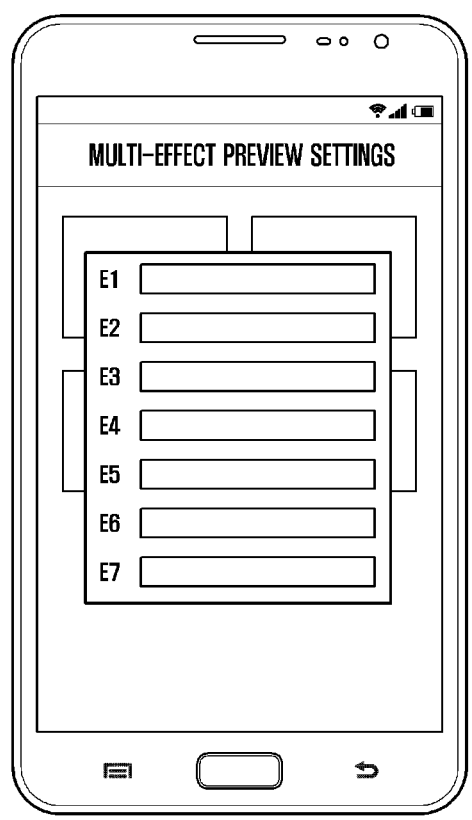

Referring to FIGS. 20 and 21, the user may select one of the displayed preview windows in the screen of FIG. 20 by tapping. If an input for selecting a preview window is received, the portable terminal outputs a screen as shown in FIG. 21. More specifically, the screen of the portable terminal shown in FIG. 20 is switched to the screen of FIG. 21 according to the user input.

An effect menu for applying an effect to the preview window selected by the user may appear as a pop-up as shown in FIG. 21. The effect menu may be displayed as a list including a name of an effect and a sample item of an effect. Accordingly, the user may apply an effect to an image to be displayed through the selected preview window. If an effect is selected by the user, the portable terminal switches the screen of FIG. 21 back to the screen of FIG. 20, and may apply the selected effect to the selected preview window.

Referring to FIG. 22, for example, if the user selects the preview window P2 from the screen of FIG. 19 and selects the effect 1 (E1: a sketch) from the effect menu, a screen corresponding to the selected preview window P2 is displayed. More specifically, the screen of the portable terminal shown in FIG. 21 is switched to the screen of FIG. 22 according to the effect selected by the user, and the effect 1 (E1: a sketch) selected by the user may be applied to the preview windows P2.

Figure 23:
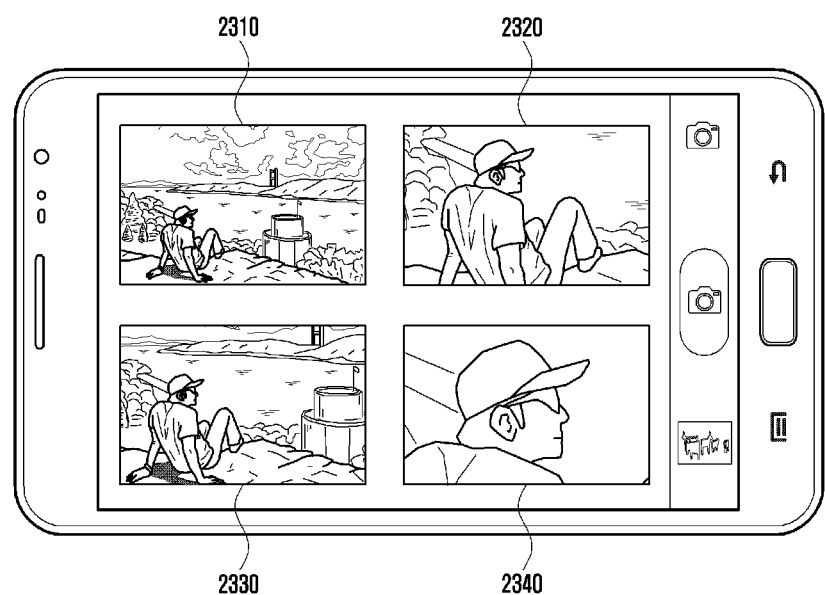
FIG. 23 illustrates a multi-frame preview mode in a portable terminal according to an embodiment of the present disclosure.

FIG. 23 illustrates a multi-frame preview mode in a portable terminal according to an embodiment of the present disclosure.

FIG. 23 illustrates a screen example of displaying images according to a plurality of framing modes set by a user.

Referring to FIG. 23, in the multi-framing preview mode, if the user drives the camera module 170 by inputting a command through the input unit 120 or the display unit 130 having an input function, preview images processed by each framing mode may be displayed through preview windows corresponding to the plurality of framings selected by the user from various framings supported by the portable terminal.

The user may configure a multi-preview mode by using 4 preview windows, and set the preview windows with different framings (for example, an extreme long shot, a full shot, a bust shot, a close-up shot, and the like). For example, the user may set a preview window 2310 with a framing of an extreme long shot, a preview window 2320 with a framing of a full shot, a preview window 2330 with a framing of a bust shot, and a preview window 2340 with a framing of a close-up shot. More specifically, the user can apply different framing compositions to each preview window, and photograph with various styles or directions by using different compositions for a subject at an identical time and location through the applied multi-preview windows.

Here, the number of preview windows provided in the display unit 130 may be variously set by the user. Although FIG. 23 shows 4 preview windows individually applied with 4 framings (i.e., an extreme long shot, a full shot, a bust shot, a close-up shot, and the like), the number of preview windows may be variously set by the user, such as 2 framings, 3 framings, 5 framings, 6 framings, all the framings.

Further, if the number of framings set by the user is greater than the number of preview windows displayed in a screen, preview windows corresponding to other framings and not displayed in the screen can be provided by switching the screen. For example, if the number of framings for preview windows is 9 and the number of preview windows configured in a screen is 4, preview windows corresponding to 4 framings are provided first as shown in FIG. 17 and preview windows corresponding to the remaining 4 framings and the last 1 framing may be sequentially displayed according to a user's scroll control.

In the state of displaying a plurality of preview windows 2310, 2320, 2330, and 2340 corresponding to a plurality of framings in a multi-framing preview mode as shown in FIG. 23, the user may perform a photographing operation using the method illustrated in FIGS. 7, 8, and 9. For example, after selecting at least one preview window and switching to a full preview window, the user may perform a photographing operation using one of a quick photographing mode and a multi-photographing mode.

Through the multi-framing preview mode, the user may obtain photographing data for each frame by using optimum compositions for the framings. For example, the user can photograph through the preview windows individually set to an extreme long shot, a full shot, a bust shot, a close-up shot, and the like, and thereby can quickly obtain photographing data for different compositions by using the 4 frame photographing using a continuous photographing mode or a multi-photographing mode.

Although not shown in FIG. 23, composition information may be provided through each preview window having a framing mode set by the user. More specifically, the composition information may be indicated as specific items, such as a text and an icon in the preview windows. For example, an item corresponding to an 'extreme long shot' may be indicated in a preview window 2310, another item corresponding to a 'full shot' may be indicated in a preview window 2320, another item corresponding to a 'bust shot' may be indicated in a preview window 2330, and another item corresponding to a 'close-up shot' may be indicated in a preview window 2340.

In the embodiment of the present disclosure, a method of setting framings manually by a user has been described as an example. However, the user may determine the number of preview windows to be applied to the multi-preview, and each preview window may be automatically set according to the compositions to be applied to each preview window. In this case, the portable terminal may automatically obtain and display images having different framings through 4 preview windows. More specifically, the portable terminal may automatically configure various framings for a subject by using at least one of a face tracing method and a moving object tracing method.

Figure 24:
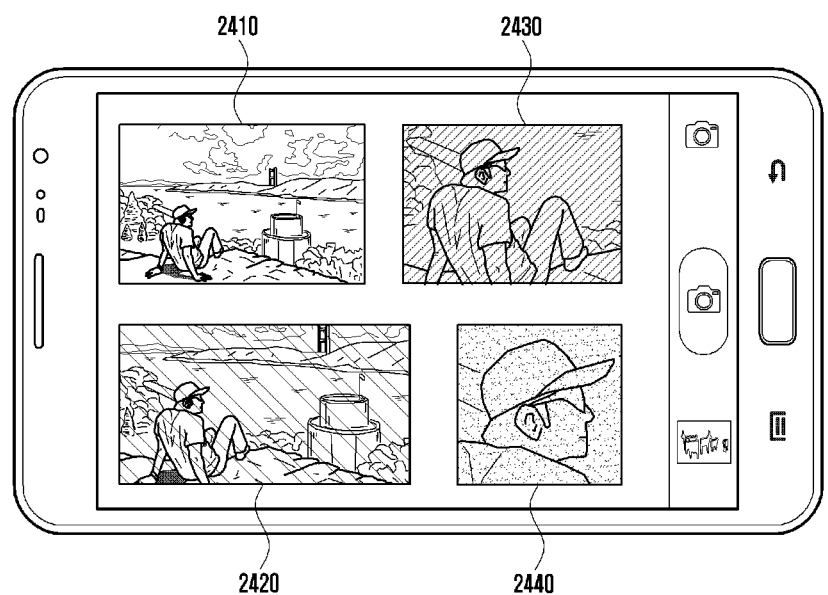
FIG. 24 illustrates a multi-preview mode of a complex composition in a portable terminal according to an embodiment of the present disclosure.

FIG. 24 illustrates a multi-preview mode of a complex composition in a portable terminal according to an embodiment of the present disclosure.

FIG. 24 illustrates a screen example of displaying images having a plurality of complex compositions set by the user in the preview windows. In the present disclosure, the complex composition refers to a composition combined with more than one composition among a screen ratio, a framing mode, an effect, and use. For example, various complex compositions can be provided according to the user's definitions, such as a complex composition combined with a screen ratio and a framing mode and a complex composition combined with a screen ratio, a framing mode, an effect, and the like.

Referring to FIG. 24, in a multi-preview mode having a complex composition, if a user drives the camera module 170 by inputting a command through the input unit 120 or the display unit 130 having an input function, images applied with at least one composition (i.e., a single composition or a complex composition) selected from various compositions supported by the portable terminal may be displayed in the preview windows.

The user may configure the multi-preview mode by using 4 preview windows as shown in FIG. 24, and at least one composition of a screen ratio, a framing mode, and an effect may be individually set to 4 preview windows. For example, the user may set a screen ratio 4:3 and a framing mode of an extreme long shot to a preview window 2410, a screen ratio 16:9, a framing mode of a full shot, and a black and white effect to a preview window 2420, a screen ratio 3:2, a framing mode of a bust shot, and a sketch effect to a preview window 2430, and a screen ratio 1:1 and a framing mode of a close-up to a preview window 2440. More specifically, the user may configure each preview window with at least one single composition or complex composition, and photograph a subject with various styles or directions at an identical time and location through a multi-preview windows set individually.

Here, the number of preview windows provided in the display unit 130 may be variously configured according to the user settings. Although FIG. 24 shows an example of displaying 4 preview windows configured with at least one composition, the number of preview windows may be variously set according to the user definition, such as 2 windows, 3 windows, 5 windows, 6 windows, and windows including all the set compositions. If the number of compositions set by the user is greater than the number of preview windows displayed in a screen, preview windows corresponding to other compositions and not displayed may be provided by switching the screens.

In the state of displaying a plurality of preview windows 2410, 2420, 2430, and 2440 corresponding to a plurality of compositions in a multi-preview mode as shown in FIG. 24, the user may perform a photographing operation using the method illustrated in FIGS. 7, 8, and 9. For example, after selecting at least one preview window and switching to a full preview window, the user may photograph by using one of a quick photographing mode and a multi-photographing mode.

Although not shown in FIG. 23, composition information may be indicated as specific items, such as a text and an icon in the preview windows. For example, an item corresponding to '4:3 and an extreme long shot' may be indicated in the preview window 2410, another item corresponding to '16:9, a full shot, and a black and white effect' may be indicated in the preview window 2420, another item corresponding to '3:2, a bust shot, and a sketch' may be indicated in the preview window 2430, and another item corresponding to '1:1 and a close-up shot' may be indicated in the preview window 2440.

Figure 25:
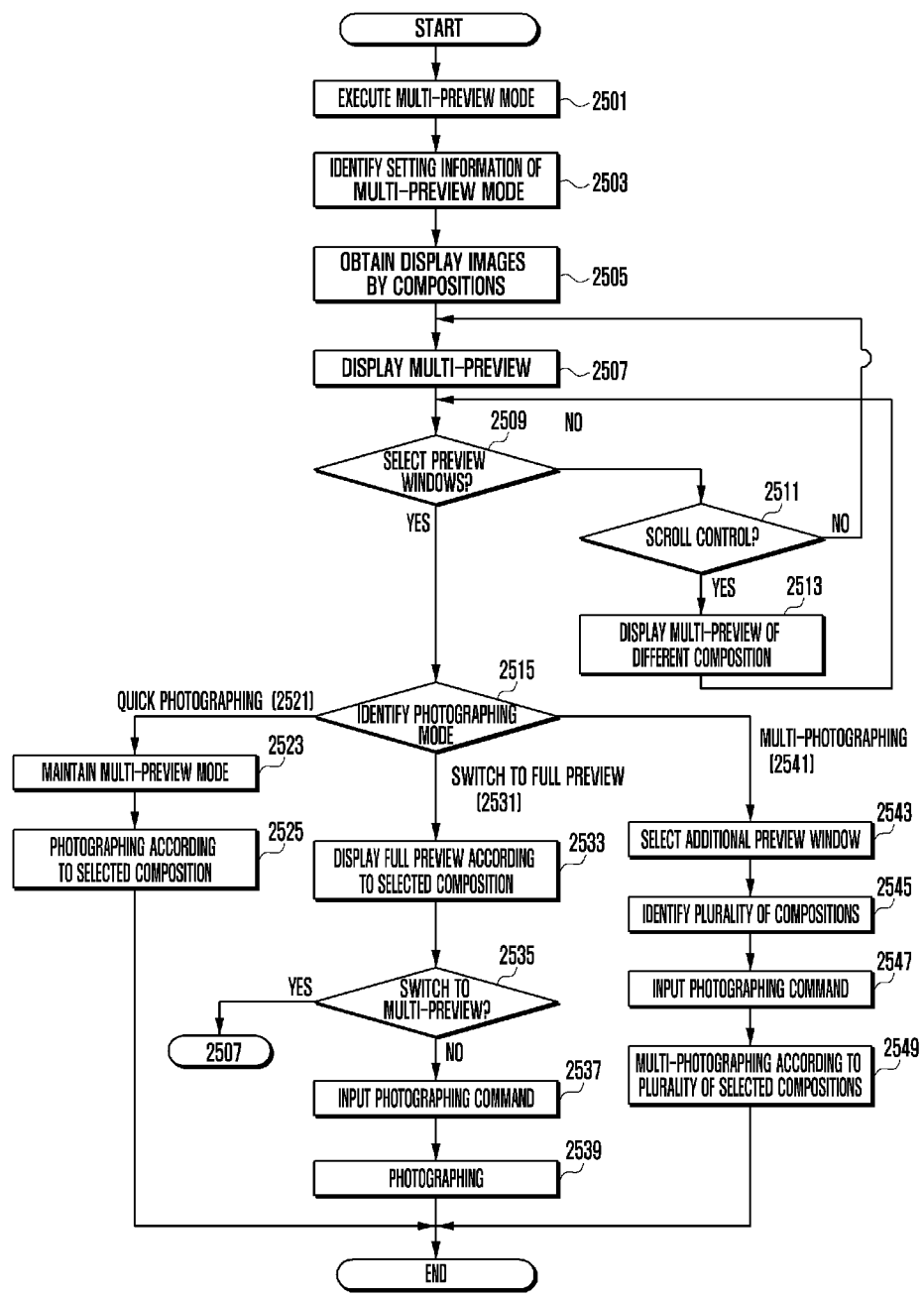
FIG. 25 is a flowchart illustrating a photographing method using a multi-preview mode in a portable terminal according to an embodiment of the present disclosure.

FIG. 25 is a flowchart illustrating a photographing method using a multi-preview mode in a portable terminal according to an embodiment of the present disclosure.

Referring to FIG. 25, the control unit 180 performs a multi-preview mode responding to a user's request at operation 2501. For example, if a command for driving the camera module 170 is generated through the input unit 120 or the display unit 130 having an input unit, the control unit 180 may identify a preview display method in which an image obtained by the camera module 170 is displayed in the display unit 130. If the preview mode is a multi-preview mode, the control unit 180 may control the multi-preview mode in which a plurality of images is displayed corresponding to a plurality of compositions set by the user.

Here, the control unit 180 identifies setting information set by the user for the operation of multi-preview mode at operation 2503. For example, the control unit 180 may identify composition information set for preview displays and arrangement information of preview windows corresponding to the plurality of compositions set by the user in the multi-preview mode.

The control unit 180 obtains an image to display a preview image corresponding to the set composition at operation 2505. For example, the control unit 180 may obtain the image from the display image buffer 237 and buffer a full resolution image in the still image buffer 235.

The control unit 180 controls to display the obtained image in the preview window configured with a composition at operation 2507. More specifically, the control unit 180 controls a multi-preview to display a plurality of images corresponding to a plurality of compositions through the display unit 130. More particularly, the control unit 180 can control the multi-preview mode so that the images obtained by the camera module 170 are processed according to the plurality of compositions and independently displayed in the preview windows of the display unit 130. Here, control unit 180 may configure preview windows according to the arrangement information.

In the state of displaying the plurality of images corresponding to the plurality of compositions, the control unit 180 identifies whether a preview window of an image having a specific composition is selected by the user at operation 2509. More specifically, the control unit 180 can detect a user input for selecting a preview window from the plurality of preview windows individually configured with compositions.

If the user input for selecting a preview window is not received at operation 2509, the control unit 180 detects a scroll control for displaying a composition set by the user in the display unit 130 at operation 2511. For example, the user may input a scroll control to switch a preview window having the current compositions to another preview window having other compositions through the display unit 130. More specifically, the user may input a scroll control for switching a screen to display other compositions set by the user.

If the user input of scroll control for switching screens is not received at operation 2511, the control unit 180 controls to return to operation 2507 and execute the following operations. If the user input of scroll control for switching screens is received at operation 2511, the control unit 180 controls to display another multi-preview screen having different compositions in the display unit 130 by switching to another screen at operation 2513, and to execute the following operations by returning to operation 2509.

If the user input for selecting a preview window is received at operation 2509, the control unit 180 identifies a photographing method set for the multi-preview mode at operation 2515. For example, the control unit 180 identifies whether the photographing mode set for the multi-preview mode is a quick photographing mode at operation 2521 for promptly photographing according to the selected composition, a full preview switching mode at operation 2531 for photographing using a corresponding composition according to a user's photographing command after switching to a full preview screen according to the selected composition, or a multi-photographing mode at operation 2541 using a plurality of selected compositions according to a user's photographing command after selecting the plurality of compositions.

At operation 2521, if it is determined that the quick photographing mode is selected, the control unit 180 maintains the multi-preview mode at operation 2523, and controls the photographing according to the compositions of the selected preview window at operation 2525. For example, if an input for selecting a display image having a specific composition is received in the quick photographing, the control unit 180 obtains a full resolution still image from the still image buffer 235, and may capture and store the still image corresponding to the composition of selected preview window. Here, the control unit 180 controls the photographing operation in a background, and maintains the display state of preview windows having different compositions. Accordingly, the user can perform a continuous photographing through sequential selection of preview windows corresponding to the plurality of compositions.

At operation 2531, if it is determined that the full preview switching mode is selected, the control unit 180 controls to display the image corresponding to the composition of selected preview window as a full preview at operation 2533. For example, control unit 180 may obtain a display image according to the composition selected by the user from the display image buffer 237, and control a preview switching to display the obtained display image as a full preview image according to the composition of preview window selected by the user.

In the state of switching to the full preview image, the control unit 180 identifies whether a user input for switching to a multi-preview mode is received at operation 2535. If the user input for switching to the multi-preview mode is received at operation 2535, the control unit 180 controls to return to operation 2507 and perform the following operations.

If the user input for switching to the multi-preview mode is not received at operation 2535, the control unit 180 waits for a user input and if a photographing command is received in the state of displaying a full preview at operation 2537, and controls the photographing based on the composition of the full preview at operation 2539. More specifically, if a photographing command is received in the state of displaying an image having a specific composition as a full preview, the control unit 180 obtains a full resolution still image from the still image buffer 235, and may capture and store the still image according to the composition of the full preview or a composition of the preview window selected by the user. Here, the control unit 180 may control the photographing operation in a background, and maintain the full preview display or display preview windows having different compositions by returning to the multi-preview mode.

If the multi-photographing is selected, the control unit 180 waits for another user input in the state of selecting a preview window having a specific composition from the preview windows displaying images corresponding to the plurality of compositions. The control unit 180 may control to display preview windows corresponding to a plurality of compositions additionally selected by the user at operation 2543. Here, the control unit 180 may feed a selection state back to the user by dividing the selected preview window having at least one composition and preview windows not selected.

If a preview window having a plurality of compositions is selected, the control unit 180 identifies the plurality of compositions corresponding to the preview window selected by the user at operation 2545.

If a photographing command is received in the state of selecting a plurality of preview windows at operation 2547, the control unit 180 controls the multi-photographing according to the plurality of selected composition at operation 2549. More specifically, the control unit 180 may obtain full resolution still images from the still image buffer 235, and capture and store the still images corresponding to the plurality of selected compositions. Therefore, the control unit 180 can generate a plurality of photographing data corresponding to the plurality of compositions selected by the user. Here, the control unit 180 may control the photographing operation in a background, and maintain the display state of preview windows in the display unit 130, and keep or discard the selection state (for example, focusing and highlighting) of the preview windows in the preview display.

FIGS. 26, 27, 28, 29, and 30 illustrate a multi-preview mode in a portable terminal according to an embodiment of the present disclosure.

Figure 26:
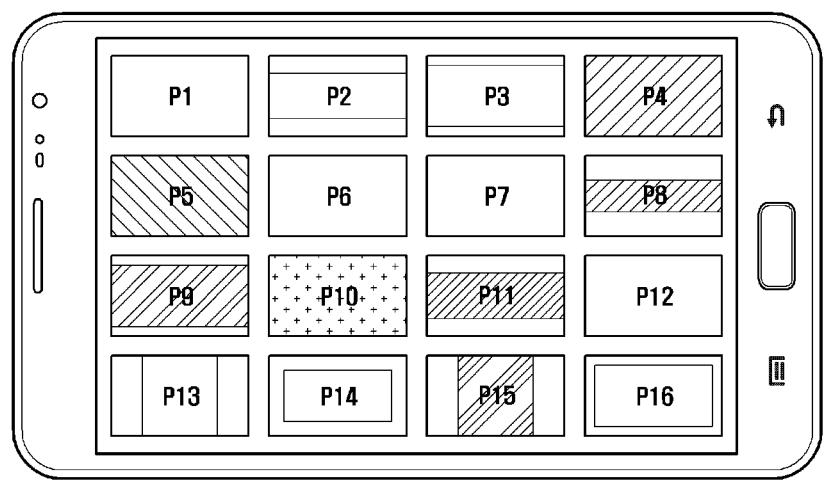
FIGS. 26, 27, 28, 29, and 30 illustrate a multi-preview mode in a portable terminal according to an embodiment of the present disclosure.

FIG. 26 illustrates a screen example of displaying images having a plurality of compositions set by a user in a multi-preview method. More particularly, FIG. 26 illustrates a screen example of indicating all the compositions or all the compositions supported by the portable terminal in a multi-preview screen.

Referring to FIG. 26, although 16 preview windows P1 to P16 having different compositions are arranged in a grid form, the number of compositions may be more or less than 16 according to the size of the display unit 130. Further, if the number of compositions supported by the portable terminal is greater than a maximum number of preview windows displayed in a screen (for example, 16 windows), preview windows of the remaining compositions may be displayed in another multi-preview screen by switching the screens.

If a user drives the camera module 170 by inputting a command through the input unit 120 or the display unit 130 having an input function, the portable terminal configures preview windows according to the number of compositions set by the user or supported by the portable terminal, and controls to display images applied with different compositions through each preview window.

The portable terminal may configure the multi-preview mode by using 16 preview windows P1 to P16 as shown in FIG. 26. At least one composition (for example, a screen ratio, an effect, a framing mode, and the like) can be set to each of 16 preview windows, and the preview window may display the images corresponding to the composition in a multi-preview screen.

For example, the preview window P1 is provided with a basic preview window having no specific composition, the preview window P2 is provided with a screen ratio 16:9, the preview window P3 is provided with screen ratio 4:3, the preview window P4 is provided with a sketch effect, the preview window P5 is provided with a black and white effect, the preview window P6 is provided with a framing mode of an extreme long shot, the preview window P7 is provided with a framing mode of a bust shot, the preview window P8 is provided with a screen ratio 16:9 and a sketch effect, the preview window P9 is provided with a screen ratio 4:3 and a black and white effect, the preview window P10 is provided with a framing mode of an extreme long shot and a sketch effect, the preview window P11 is provided with a screen ratio 16:9 and a framing mode of a bust shot, the preview window P12 is provided with a screen ratio 4:3, a sketch effect, and a framing mode of an extreme long shot. The remaining preview windows P13 to P16 may be provided in different forms by applying at least one composition in a similar method as described above.

Here, each preview window of P1 to P16 is configured with an identical size, and images in the preview windows may be displayed as different thumbnails according to the compositions. More specifically, various preview windows may be displayed in a grid form through the screen of the display unit 130 by applying various combinations of a single composition or a complex composition. Here, all the sizes of preview windows shown are identical. However, the contents of images displayed in each preview window may vary according to the applied compositions.

According to the embodiment of the present disclosure, a plurality of preview windows having different forms are provided corresponding to at least one composition in the multi-preview mode, and thereby a user can perform an easy and quick photographing according to desired compositions, and photograph a subject with various styles and directions at an identical time and location by using different compositions.

Although not shown in FIG. 26, information having at least one composition may be provided in the preview windows. Each preview window may indicate the composition information of a single composition or a complex composition with a specific item (for example, a text, an icon, and the like).

Further, the user can control the operations of a full preview switching mode, a quick photographing mode, and a multi-photographing mode according to the user setting in the multi-preview screen having a grid form. In the state of FIG. 26, the full preview switching mode, the quick photographing mode, and the multi-photographing mode may be performed as follows.

First, the full preview switching mode is described. If the user selects a preview window from the plurality of preview windows P1 to P16 corresponding to the plurality of compositions shown in FIG. 26, the multi-preview screen in a grid form is switched to a full preview screen applied with a composition of a selected preview window. More specifically, a full preview image having a corresponding composition can be displayed in the preview window as shown FIG. 6. Alternatively, the full preview image may be displayed in forms shown in FIGS. 27 and 28, which will be described below. The user may switch the full display state back to the previous state, i.e., a multi-preview state, or perform a photographing operation according to the selected composition.

Second, the quick photographing mode is described. If the user selects a preview window from the plurality of preview windows P1 to P16 corresponding to the plurality of compositions shown in FIG. 26, a photographing operation is instantly performed according to the composition (i.e., a single composition or a complex composition) of the selected preview window. Here, the multi-preview state of the display unit 130 is maintained, and the photographing operation may be performed in a background. Accordingly, the user can perform a continuous photographing operation according to the compositions. For example, the user may sequentially select the preview windows of FIG. 26 in the order of P2, P5, P10, and P16. The control unit 180 then controls the continuous photographing operation responding to the user's sequential selection of preview windows. Here, the control unit 180 may control to perform the photographing operation in sequence of the compositions set for the preview windows P2, P5, P10, and P16.

Lastly, the multi-photographing mode is described. The user may select a preview window from the plurality of preview windows P1 to P16 corresponding to a plurality of compositions shown in FIG. 26, and select another preview window having a different composition. More specifically, the user may select a plurality of preview windows. If the user selects a preview window, the control unit 180 may feed the selection state back to the user while maintaining the multi-preview display state. The control unit 180 may control to output another feedback according to the user's additional selection of the preview window in the state of selecting the preview window. For example, if the user selects 3 preview windows individually having 3 different compositions, the control unit 180 may feed the state of selecting 3 preview windows back to the user. In this state, if the user select again the selected preview window, the selection of the corresponding preview window is canceled. The user may perform a multi-photographing operation corresponding to each composition of the plurality of selected preview windows by inputting a photographing command. Here, while performing the multi-photographing operation, the multi-preview display state of the display unit 130 is maintained and the photographing operation may be performed in a background.

Figure 27:
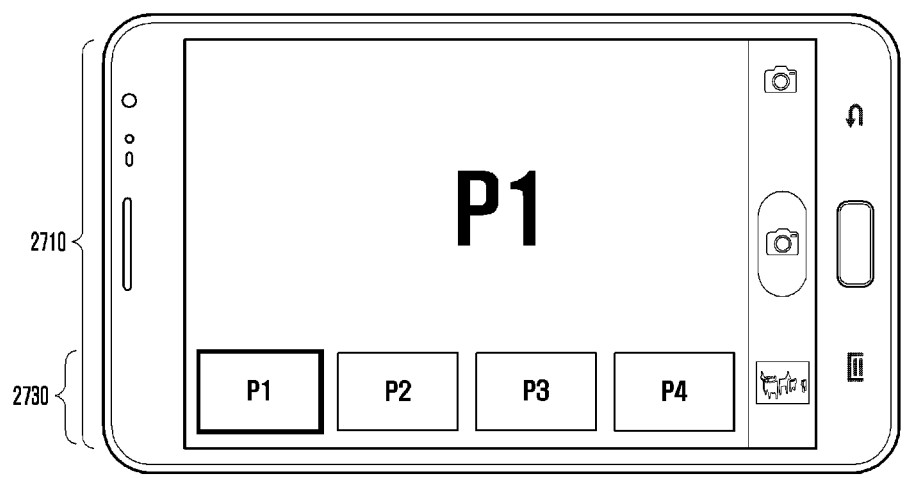
Figure 28:
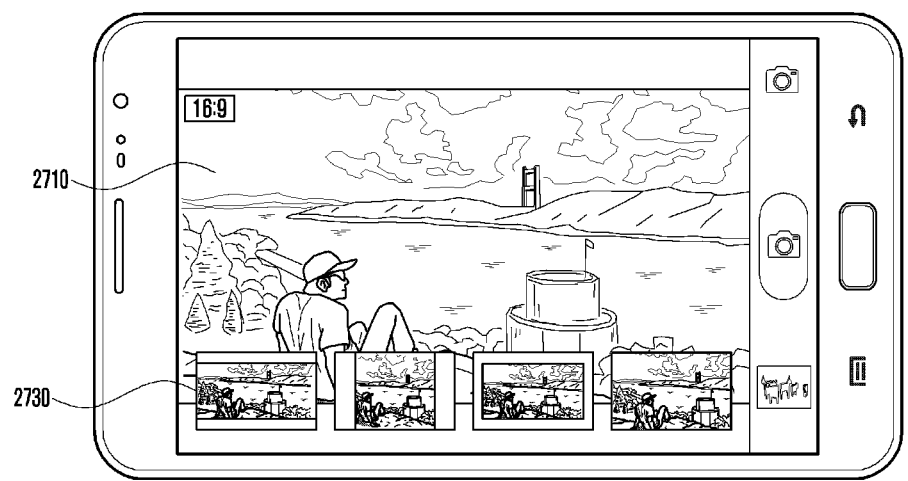

FIGS. 27 and 28 illustrate screens displayed in a multi-preview mode of the portable terminal according to an embodiment of the present disclosure.

FIG. 27 illustrates a screen example of the portable terminal when a plurality of images corresponding to a plurality of compositions are displayed in a multi-preview mode, and FIG. 28 illustrates a screen example of displaying preview windows of a specific subject corresponding to each composition in the multi-preview mode.

More particularly in FIGS. 27 and 28, a preview screen of a specific composition (i.e., a single composition or a complex composition) set or selected by a user from compositions or from all the compositions supported by the portable terminal is switched to a full preview image, and preview screens of the remaining composition are displayed in a thumbnail form which can be overlaid on the full preview image.

Referring to FIGS. 27 and 28, the multi-preview mode may include a full preview area 2710 displaying a full preview image and a mini preview area 2730 overlaid in the full preview area and displaying small preview windows of images corresponding to each composition. The mini preview area 2730 may be provided as an overlay in the full preview area 2710 or in a separate area by dividing the full preview area 2710 and the mini preview area 2730.

If a user drives the camera module 170 by inputting a command through the input unit 120 or the display unit 130 having an input function, an image of preview window selected by the user from various compositions (for example, a single composition or a complex composition including a screen ratio, a framing mode, an effect, use, and the like) supported by the portable terminal may be displayed in the full preview area 2710, and images having at least 2 different compositions may be displayed through the mini preview area 2730. The full preview image displayed in the full preview area 2710 is one of the preview windows selected by the user.

More specifically, for providing the plurality of images having a plurality of compositions in a multi-preview mode, an image having a specific composition selected from the plurality of compositions is displayed as a full preview image in the display unit 130, and thumbnails of the full preview image and at least one image having a different composition may be displayed by overlaying in a partial area of the full preview image (for example, the mini preview area 2730 at the lower part of screen). For example, an image (for example, an image displayed in the preview window P1) having a specific composition may be provided in the full screen, and all the images of the plurality of compositions may be provided through the preview windows P1 to P16 overlaid as thumbnails on the full preview image.

Here, an example of displaying 4 preview windows P1 to P4 corresponding to 4 different compositions as a mini screen and an image of a specific preview window P1 selected by the user from the preview windows P1 to P4 as a full preview image has been described. However, the number of preview windows provided in the mini preview area 2730 may be selected according to the user settings or the size of the display unit 130.

If the number of composition set by the user is greater than the maximum number of preview windows displayed in the mini preview area 2730, compositions other than the currently displayed composition may appear in the mini preview area 2730 by a scroll control in a sliding manner. When controlling the scroll of preview windows in the mini preview area 2730, the display of full preview image may be maintained. For example, in the state of displaying images through 4 preview windows P1 to P4 in the mini preview area 2730, images of the remaining compositions in preview windows P5 to P16 may sequentially appear in the mini preview area 2730 according to the user's scroll control.

Although not shown in FIGS. 27 and 28, information for each composition may be provided through the preview windows. For example, a specific item, such as a text and an icon may be indicated in an area of the full preview screen to inform with which composition the full preview image is displayed.

In the state of displaying images in the multi-preview mode, the user may select another preview window to display an image having a different composition as a full preview.

For example, in the state of displaying preview window P1 as a full preview, the user may select another desired preview window (for example, P3) having a different composition by tapping. If an input for selecting the preview window P3 is received, the control unit 180 may control to display the selected preview window as a full preview. More specifically, the full preview image in the preview window P1 of FIG. 27 may be switched to the full preview image corresponding to the preview window P3. If the preview window P3 is selected, the control unit 180 may feed the selection state back to the user by using the preview window P3. The feedback may be provided by focusing or highlighting the selected preview window to distinguish from unselected preview windows as shown by the preview windows P1 of FIG. 27.

The full preview of FIGS. 27 and 28 may be provided in response to the composition (for example, a screen ratio, a framing mode, an effect, a complex composition, and the like) of the selected preview window. More specifically, an image of a preview window selected by the user may be displayed as a full preview image corresponding to a specific composition.

In the state of displaying the full preview, the user may perform a photographing operation based on the composition of the full preview by inputting a photographing command by pressing a shutter button.

Figure 29:
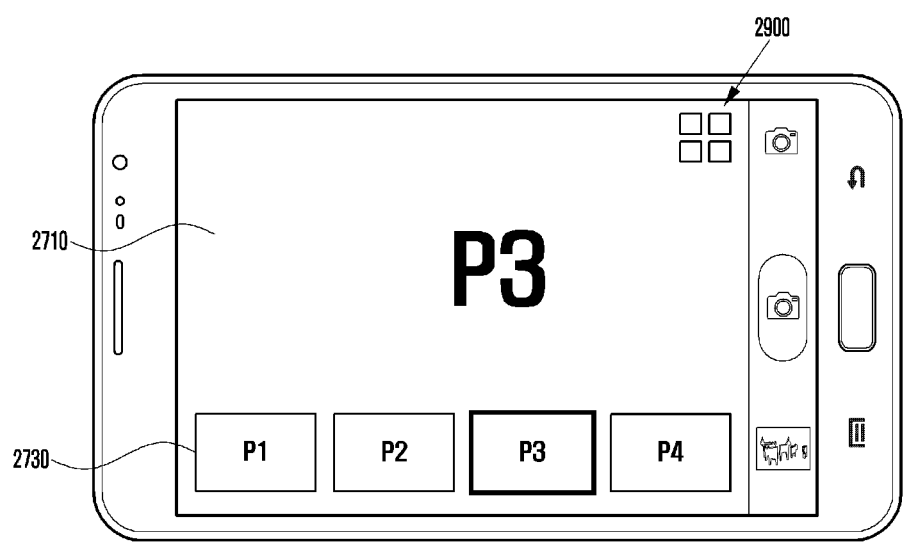

FIG. 29 illustrates a multi-preview mode in a portable terminal according to an embodiment of the present disclosure.

Referring to FIG. 29, the multi-preview mode configuration may be similar to that of FIG. 27, and further includes a grid switching item 2900 which switches the multi-preview displaying a full preview window and a plurality of mini preview windows respectively in the full preview area 2710 and mini preview area 2730 to a multi-preview displaying mini preview windows corresponding to different compositions in a grid form (for example, the multi-preview state of FIG. 26).

Accordingly, the user can select the grid switching item 2900 by tapping in the multi-preview state of FIG. 29. The control unit 180 controls to switch the screen of FIG. 29 or FIG. 30 to the multi-preview screen of FIG. 26. More specifically, the screen of the portable terminal shown in FIG. 29 or FIG. 30 is switched to the screen of FIG. 26 according to the selection of grid switching item 2900.

Further, the grid switching item 2900 may be regularly displayed in a certain area of the full preview area 2710 as shown in FIG. 29, and the display of grid switching item 2900 may be switched on or off according to a user's selection.

Figure 30:
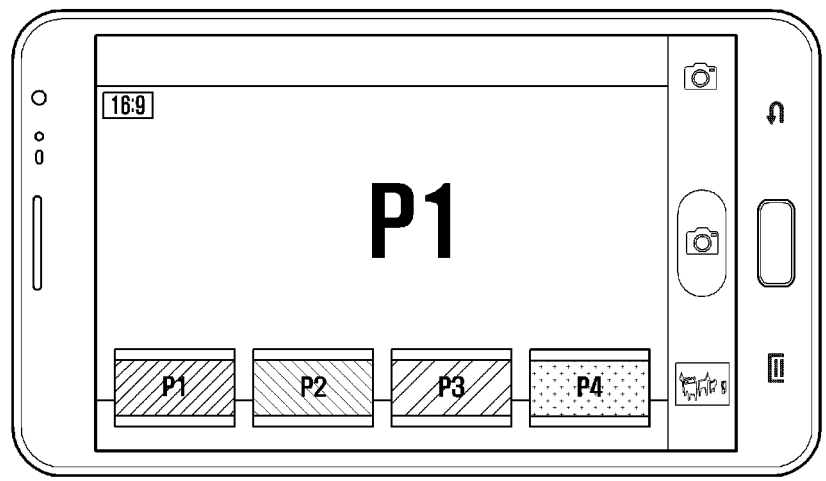

FIG. 30 illustrates a multi-preview mode in a portable terminal according to an embodiment of the present disclosure.

Referring to FIG. 29, the multi-preview mode configuration may be similar to that of FIG. 27 but different from FIG. 28 in a method of operating the preview.

Referring to FIGS. 27 and 30, all the compositions (that is, a single composition or a complex composition) of FIG. 27 may be provided through the preview windows P1 to P16 in the mini preview area 2730 by combining. For example, in FIG. 27, the preview window P1 is provided with a basic preview window having no specific composition, the preview window P2 is provided with a screen ratio 16:9, the preview screen P3 is provided with a screen ratio 4:3, and the preview window P4 is provided with a sketch effect. The remaining preview window P5 to P16 may be provided in different forms by using the same method described above.

More specifically, all the compositions are provided through the preview windows in the mini preview area 2730 regardless of the composition types as shown in FIG. 27. If the user selects a specific preview window from the preview windows in the mini preview area 2730, the selected preview window displays a full preview image by applying at least one composition (i.e., a single composition or a complex composition). Accordingly, the preview windows in the mini preview area 2730 may be configured with a single composition, such as a specific screen ratio (for example, 16:9, 4:3, and 1:1), a specific framing (for example, a close-up shot, a bust shot, an extreme long shot, and the like), and a specific effect (for example, a sketch, a black and white effect, a vintage effect, and the like), or may be configured with a complex composition having a combination of different composition (for example, ratio1+effect1, framing1+effect1, ratio2+effect3+framing2, and the like).

FIG. 30 illustrates an example of providing a complex composition combined with a first composition including factors through the preview windows P1 to P4 in the mini preview area 2730 and a second composition including factors selected based on the first composition. For example, in the present disclosure, the compositions may include a screen ratio, an effect, a framing mode, use, and the like, as described above. The factors of composition indicate types of compositions. For example, the screen ratio composition may include factors, such as 16:9, 4:3, 3:2, and 1:1. The effect composition may include factors, such as a sketch, black and white, sepia, distortion, synthesis, animation, vignetting, vintage, a color transformation, pastel, a luminance, an image quality improvement, a background change, panorama, and the like, and the framing composition may include factors, such as an extreme close-up shot, a big close-up shot, a close-up shot, a bust shot, a waist shot, a knee shot, a full shot, a long shot, an extreme long shot, and the like.

The first composition may be a screen ratio and the second composition may be an effect. In FIG. 30, it is assumed that the screen ratio is set to a factor of 16:0 and the effects are set to factors of a sketch, black and white, distortion, and sepia. Accordingly, 4 preview windows P1 to P4 are displayed in the mini preview area 2730 according to the number of factors set to the second composition. All the preview windows P1 to P4 display images with an identical screen ratio of 16:9 and individually different effects of a sketch, black and white, distortion, and sepia. For example, the preview window P1 displays an image with a screen ratio 16:9 and a sketch effect, the preview window P2 displays an image with a screen ratio 16:9 and a black and white effect, the preview window P3 displays an image with a screen ratio 16:9 and a distortion effect, and the preview window P4 displays an image with a screen ratio 16:9 and a sepia effect.

More specifically, the preview windows are provided in the mini preview area 2730 by combining at least 2 compositions selected by the user. Here, one of compositions selected by the user may be a basic composition (i.e., a screen ratio 16:9 as the first composition) and the other one may be an auxiliary composition (i.e., an effect as the second composition) including a sketch, a black and white effect, a distortion, and sepia. The number of preview windows displayed in the mini preview area 2730 may be selected according to the number of factors selected as the auxiliary compositions.

If a specific preview window is selected by the user from the preview windows in the mini preview area 2730, a full preview image may be displayed by reflecting complex compositions including the basic composition and auxiliary compositions.

More specifically, the preview windows provided in the mini preview area 2730 may be configured with a composition of screen ratio 16:0 and another composition of a sketch, a black and white effect, a distortion, and sepia. Accordingly, a specific composition can be selected from various effects, and thereby the user's selection is widened.

Although an example of combining a basic composition and auxiliary composition has been illustrated in FIG. 30, the method of configuring a multi-preview display may be further provided. For example, a combination of a basic composition having no factor and an auxiliary composition selected from a screen ratio, an effect, and a framing mode may be provided, or a combination of a basic composition having an effect and an auxiliary composition having a screen ratio or framing may be provided.

Figure 31:
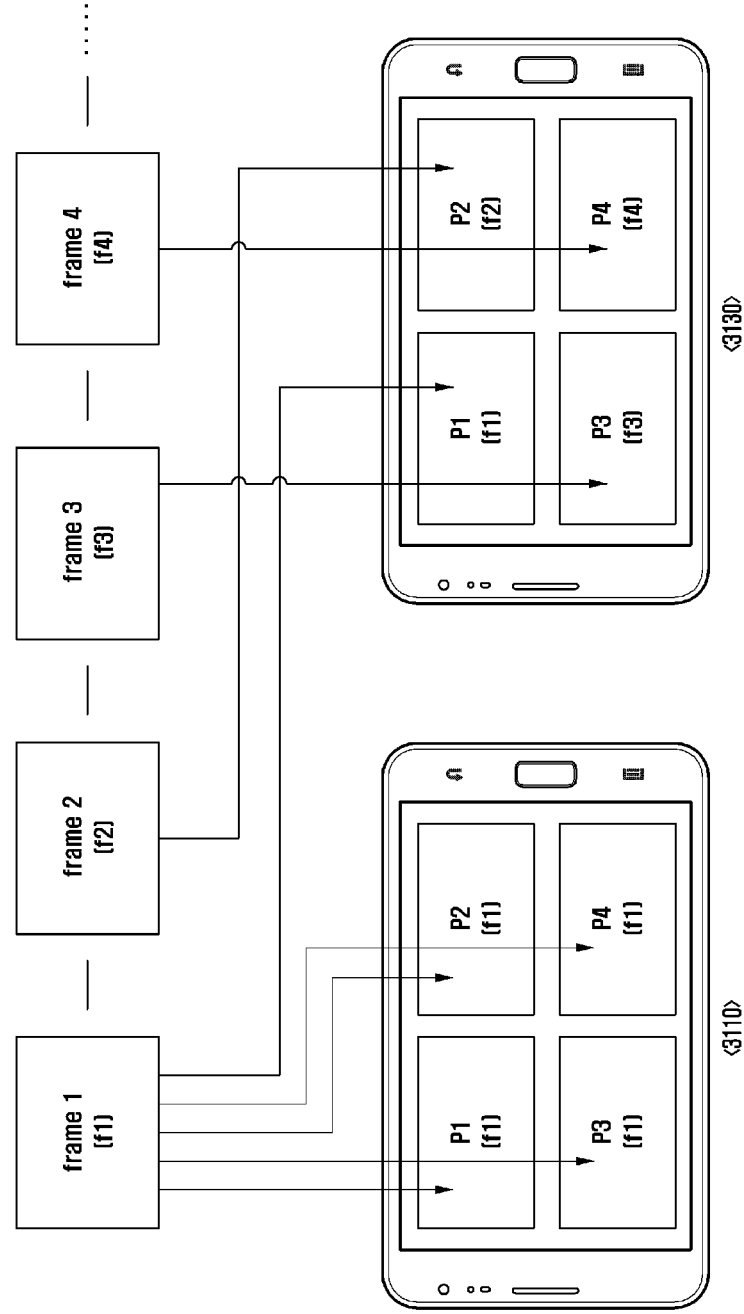
FIG. 31 is a schematic diagram illustrating an operation of obtaining a display image of a preview window for a multi-preview window in a portable terminal according to an embodiment of the present disclosure.

FIG. 31 is a schematic diagram illustrating an operation of obtaining a display image of a preview window for a multi-preview display in a portable terminal according to an embodiment of the present disclosure.

Referring to FIG. 31, in the embodiment of the present disclosure, images for displaying in preview windows having a plurality of compositions set by a user can be obtained by processing every frame image obtained by the camera module 170.

Referring to FIG. 31, it is assumed that a frame 1, frame 2, frame 3, and frame 4 are sequentially obtained by the camera module 170 and preview windows are configured with a preview window P1, a preview window P2, a preview window P3, and a preview window P4. The operations of obtaining images for each preview window are described under these assumptions.

Referring to FIG. 31, the photographing mode may be divided into a first mode (i.e., a division photographing mode) of obtaining an image at a frame for the preview windows as shown by Screen 3110 and a second mode (i.e., a continuous photographing mode) of sequentially obtaining a plurality of images and distributing to each preview window as shown by Screen 3130. In the latter case, the number of images being obtained may be selected according to the number of preview windows, and thereby 4 images of the frame 1 to frame 4 may be obtained corresponding to the 4 preview windows.

Referring to Screen 3110, the division photographing method obtains display images for the preview windows by using a frame image. Accordingly, an image f1 of frame 1 is allocated to each preview window and displayed according to the compositions set for each preview window.

For example, the image f1 of frame 1 is allocated to the preview window P1 and displayed according to the composition set for the preview window P1, the image f1 of frame 1 is allocated to the preview window P2 and displayed according to the composition set for the preview window P2, the image f1 of frame 1 is allocated to the preview window P3 and displayed according to the composition set for the preview window P3, and the image f1 of frame 1 is allocated to the preview window P4 and displayed according to the composition set for the preview window P4.

As described above, the division photographing method provides an image of an identical subject in each preview window and the images in the preview windows are displayed according to the composition set for each preview window. More specifically, the division photographing method generates different types of display images by applying different compositions to the identical frame image in each preview windows.

Referring to Screen 3130, the continuous photographing mode generates display images by using a plurality of images obtained at every frame. In Screen 3130, 4 images f1, f2, f3, and f4 of the frame 1 to frame 4 are displayed corresponding to the number of preview windows. Accordingly, the images of frame 1 to frame 4 are sequentially allocated to each preview window according to an arrangement method, and each image is displayed in the preview windows individually having different compositions.

For example, an image f1 of frame 1 is allocated to the preview window P1 and displayed according to the composition set for the preview window P1, an image f2 of frame 2 is allocated to the preview window P2 and displayed according to the composition set for the preview window P2, an image f3 of frame 3 is allocated to the preview window P3 and displayed according to the composition set for the preview window P3, and an image f4 of frame 4 is allocated to the preview window P4 and displayed according to the composition set for the preview window P4.

As described above, the continuous photographing mode obtains images of different subjects at every frame and generates different display images in each preview window corresponding to set compositions.

Figure 32:
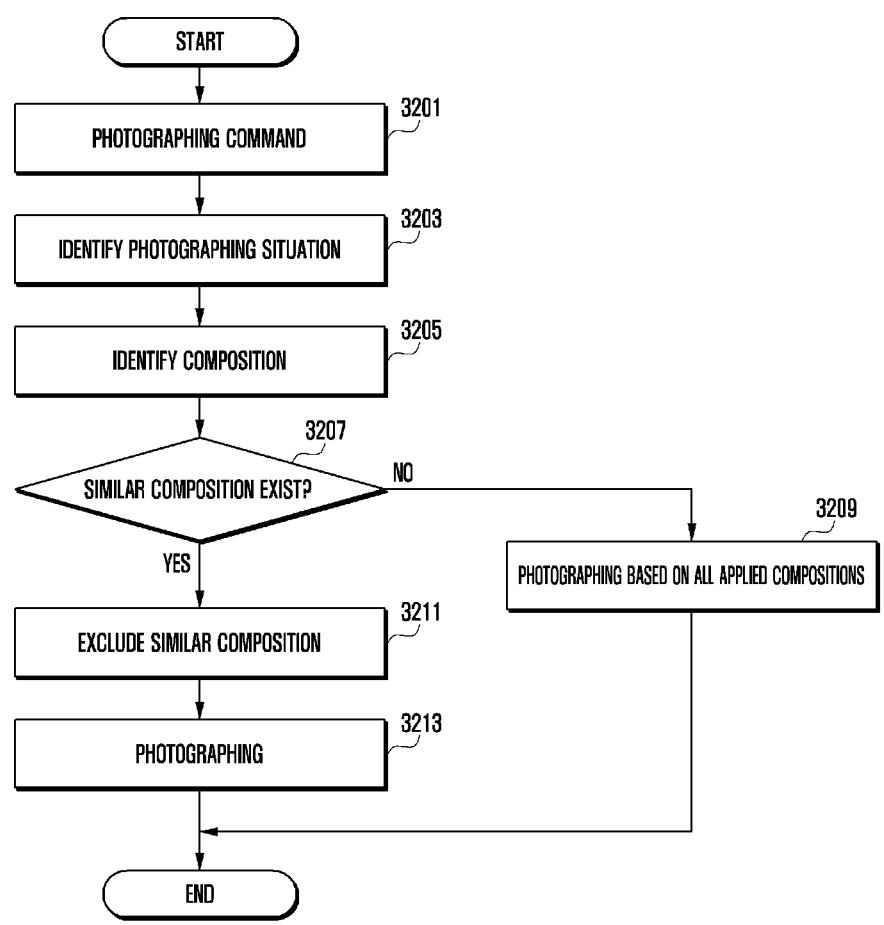
FIG. 32 is flowchart illustrating a photographing method in a portable terminal according to an embodiment of the present disclosure.

FIG. 32 is flowchart illustrating a photographing method in a portable terminal according to an embodiment of the present disclosure. 1002911 FIG. 32 illustrates an example of a photographing operation in which a photographing situation is identified for a specific composition set by a user (for example, an effect), and the photographing is performed by selecting a photographing function according to the set composition. More specifically, FIG. 32 illustrates a method of photographing according to a set composition or photographing by excluding the set composition. Accordingly, the photographing operation can be performed according to various compositions set in the multi-preview mode. More particularly, the photographing operation can be selectively performed by including an effect composition set by the user.

Referring to FIG. 32, if a user input of a photographing command is received at operation 3201, the control unit 180 identifies the current photographing situation at operation 3203. For example, if a photographing command is input through the input unit 120 or the display unit 130 having an input function, the control unit 180 analyzes a photographing situation by using an image obtained by the camera module 170. In the present disclosure, the photographing situation may include surrounding environments, such as sceneries of autumn foliage, a water body (i.e., a sea, and the like), and a sunset, corresponding to a composition (i.e., an effect and color) determined by the portable terminal. More specifically, the identification of the photographing situation may be an operation of identifying an overlapping between a photographed subject and a composition.

The control unit 180 identifies a currently applied composition at operation 3205. More specifically, the control unit 180 can identify a composition set by the user for the photographing operation. Although an example of identifying a composition after selecting the photographing situation is illustrated in FIG. 32, the control unit 180 may perform the identification of photographing situation and identification of composition in parallel.

Subsequently, the control unit 180 identifies a similarity by comparing the photographing situation with the composition at operation 3207. For example, the control unit 180 may identify whether at least one composition is set corresponding to the current photographing situation. More particularly, the control unit 180 can identify whether a similar composition corresponding to the current photographing situation exists by comparing the at least one composition and the current photographing situation. Here, the control unit 180 may select the similarity between the current photographing situation and composition if the similarity is greater than a reference value. The reference value may be determined according to a composition. For example, the reference value may be defined as 70% of tone or color strength in the effect composition, and the similarity may be selected if a detected value is greater than 70%. The reference value for each composition may be variously defined by the user.

If a similar composition is not set corresponding to the photographing situation at operation 3207, the control unit 180 controls photographing based on all the applied compositions at operation 3209.

If a similar composition is set corresponding to the photographing situation at operation 3207, the control unit 180 controls photographing by excluding the similar composition at operation 3211. The control unit 180 then controls photographing based on a basic composition or the remaining compositions at operation 3213. For example, if a blue color effect is set to the composition and the current photographing situation is in a blue environment, such as a water body (i.e., a scenery of a sea, and the like), the control unit 180 may perform the photographing operation by excluding the blue color effect. If a vintage effect is set to the composition and the current photographing situation is in a similar environment as that of a scenery of a sunset, the control unit 180 may perform the photographing operation by excluding the vintage effect. More particularly, if a plurality of compositions is set for the photographing operation, the control unit 180 may exclude similar compositions and control photographing using the remaining compositions. For example, if the plurality of composition includes a screen ratio 16:9 and a vintage effect and the vintage effect is similar to the current photographing situation, the control unit 180 may control the photographing operation using the screen ratio 16:9 and excluding the vintage effect. Further, if the set composition is identical to the current photographing situation, the control unit 180 may control to perform a basic photographing not applied with any composition according to the principal of excluding similar compositions.

As described above, according to the embodiment of the present disclosure, the control unit 180 can select the application of compositions (i.e., an effect composition) according to a user's photographing command. For example, when photographing by applying a specific effect, the control unit 180 detects a photographing situation from an image obtained by the camera module 170, and controls the photographing operation by excluding a specific effect if the specific effect overlaps the photographing situation. More specifically, if a sunset effect is applied and a photographing operation is to be performed in an environment of sunset, the photographing operation is performed by excluding the sunset effect. If a blue color effect is applied and a photographing is to be performed a water body (i.e., a sea, and the like), the photographing operation is performed by excluding the blue color effect. Therefore, performing a photographing operation with overlapping photographing situation and compositions can be avoided in a situation that a user does not recognize the current situation, and a user convenience is improved accordingly.

Although drawings and descriptions are omitted in the embodiment of the present disclosure, an Auto Focusing (AF) function may be further included. For example, according to the embodiment of the present disclosure, the AF function may be performed at the time of capturing a still image according to a user's photographing command. Further, the AF function may be performed for each preview window in a multi-preview mode. Alternatively, the AF function may be performed at the time of starting the multi-preview mode and once again at the time of inputting a photographing command. In the embodiment of the present disclosure, the AF function may also operate according to a user's manual input (for example, by long pressing a shutter button or a preview window).

As described above, the various embodiments of the present disclosure may be performed by a program command executable through various computers and storable in a recording media readable by the computers. The recording media readable by the computer may include a program command, data file, data structure, and their combination. The program command stored in the recording media may be one of specially designed for the present disclosure or one of commonly used in the field of computer software.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for photographing using a mobile terminal, the method comprising:
   driving a camera to execute a preview mode;
   obtaining a plurality of images with respect to a subject, each image being in a respective aspect ratio of a plurality of aspect ratios, while driving the camera;
   when the camera is operating in a multi-preview mode, simultaneously displaying the plurality of images on a display through a plurality of preview windows;
   when an input for selecting a preview window from the plurality of preview windows is received, identifying a selected photographing mode;
   when the photographing mode is identified as comprising a full preview mode, displaying a single image of the selected preview window by switching to a full preview according to an aspect ratio of the selected preview window; and
   when a photographing command is input by a user while displaying the selected preview window in the full preview mode, photographing according to the aspect ratio of the selected preview window.

2. The method of claim 1, further comprising:
   receiving a user input selecting an image from the plurality of display images; and
   photographing an image corresponding to the aspect ratio of the selected image.

3. The method of claim 1, wherein the displaying of the plurality of images comprises displaying each image in a respective preview window corresponding to the respective aspect ratio.

4. The method of claim 3, wherein the displaying of the plurality of images comprises generating an image in a frame period corresponding to the plurality of preview windows through the camera.

5. The method of claim 3, wherein the displaying of the plurality of images comprises generating a plurality of images sequentially obtained at every frame period by distributing frame periods corresponding to the plurality of preview windows.

6. A method for photographing using a mobile terminal, the method comprising:
   executing a preview mode according to an activation of a camera;
   obtaining a plurality of images with respect to a subject corresponding to a plurality of aspect ratios while executing the preview mode;
   displaying the plurality of images corresponding to the plurality of aspect ratios through a plurality of preview windows in a multi-preview mode; and
   photographing based on at least one aspect ratio according to a user's selection in the multi-preview mode,
   wherein the photographing comprises:
      when an input for selecting a preview window from the plurality of preview windows is received, identifying a selected photographing mode,
      when the photographing mode is identified as comprising a full preview mode, displaying a single image of the selected preview window by switching to a full preview according to an aspect ratio of the selected preview window, and
      when a photographing command is input by a user while displaying the selected preview window in the full preview mode, photographing according to the aspect ratio of the selected preview window.

7. The method of claim 6, further comprising configuring the plurality of preview windows corresponding to the plurality of aspect ratios.

8. The method of claim 7, wherein the plurality of preview windows correspond to the plurality of aspect ratios.

9. The method of claim 7, wherein the photographing further comprises, the photographing mode is identified as a quick photographing mode, photographing instantly according to the aspect ratio of the selected preview window.

10. The method of claim 6, wherein the photographing further comprises:
    receiving an input for sequentially selecting a set of preview windows from the plurality of preview windows in the quick photographing mode; and
    continuously photographing for each aspect ratio of the set of preview windows.

11. The method of claim 6, wherein the photographing further comprises:
    receiving an input of a photographing command in a state that the plurality of preview windows is selected; and
    photographing for each aspect ratio of the plurality of preview windows according to the photographing command.

12. The method of claim 6, wherein the photographing further comprises:
    identifying a situation based on an image corresponding to the user's selection; and
    performing the photographing by excluding a specific aspect ratio corresponding to the situation.

13. The method of claim 7, further comprising:
    when the preview mode is a single preview mode, displaying an image in a full preview window according to an aspect ratio;
    receiving a user input in a state of displaying the full preview window;
    when the user input is a photographing command, photographing corresponding to the display image of the full preview window; and
    when the user input is a scroll command, displaying preview windows corresponding to the plurality of aspect ratios by switching to the plurality of preview windows.

14. The method of claim 6, wherein the displaying of the plurality of images in the multi-preview mode comprises:
    displaying according to at least one of a multi-screen ratio preview mode, a multi-frame preview mode, a multi-effect preview mode, or a multi-preview mode of a complex aspect ratio.

15. The method of claim 6, further comprising:
    receiving an input for selecting at least one preview window from the preview windows; and
    feeding back by using at least one of an acoustic sense, a visual sense, or a tactile sense, corresponding to the selected at least one preview window.

16. A mobile terminal comprising:
    a camera;
    a display; and
    at least one processor configured to:
       drive the camera to execute a preview mode,
       obtain a plurality of images with respect to a subject, each image being in a respective aspect ratio of a plurality of aspect ratios, while driving the camera,
       when the camera is operating in a multi-preview mode, control the display to simultaneously output the plurality of images through a plurality of preview windows,
       when an input for selecting a preview window from the plurality of preview windows is received, identifying a selected photographing mode,
       when the photographing mode is identified as comprising a full preview mode, control the display to display a single image of the selected preview window by switching to a full preview according to an aspect ratio of the selected preview window, and
       when a photographing command is input by a user while displaying the selected preview window in the full preview mode, control photographing according to the aspect ratio of the selected preview window.

17. The mobile terminal of claim 16, wherein the at least one processor is further configured to output the plurality of images through a plurality of preview windows corresponding to the plurality of different aspect ratios.

18. The mobile terminal of claim 17, wherein the plurality of preview windows comprises at least one different composition selected from the plurality of different aspect ratios.

19. The mobile terminal of claim 16, wherein the at least one processor is further configured to:
    form a set of preview windows for each of the aspect ratios selected by a user while displaying the plurality of preview windows,
    display images corresponding to the set of preview windows, and
    control photographing corresponding to at least one aspect ratio and according to a user's photographing command in a state of displaying the plurality of preview windows.

20. The mobile terminal of claim 16, wherein the at least one processor is further configured to generate an image in a frame period corresponding to the plurality of preview windows.

21. The mobile terminal of claim 16, wherein the at least one processor is further configured to:
generate a plurality of images sequentially obtained in a frame period, and
distribute the obtained images corresponding to the plurality of preview windows.

22. The mobile terminal of claim 16, further comprising:
a storage configured to:
store setting information related to the photographing,
buffer at least one image when entering the preview mode, and
store photographed images for each of the plurality of different aspect ratios.

23. A mobile terminal comprising:
a camera,
a display,
a storage configured to:
store setting information related to photographing,
buffer at least one image when entering a basic preview mode, a single preview mode, or a multi-preview mode, and
store photographed images; and
at least one processor configured to:
drive the camera to obtain a plurality of images corresponding to a plurality of aspect ratios,
control the display to display one of the basic preview mode, the single preview mode, or the multi-preview mode,
form a set of preview windows from a plurality of preview windows for aspect ratios selected by a user while displaying the multi-preview window,
display images corresponding to the set of the preview windows selected by the user,
control photographing corresponding to at least one aspect ratio of the plurality of the aspect ratios and according to a user's photographing command in a state of displaying the multi-preview window,
when an input for selecting a preview window from the plurality of preview windows is received, identifying a selected photographing mode,
when the photographing mode is identified as comprising a full preview mode, control the display to display a single image of the selected preview window by switching to a full preview according to an aspect ratio of the selected preview window, and
when a photographing command is input by the user while displaying the selected preview window in the full preview mode, control photographing according to the aspect ratio of the selected preview window.

24. The mobile terminal of claim 23, wherein the plurality of preview windows comprise an image displayed in a preview window corresponding to an aspect ratio of the plurality of different aspect ratios.

25. The mobile terminal of claim 23, wherein the multi-preview mode comprises a multi-screen ratio preview mode, a multi-frame preview mode, a multi-effect preview mode, and a multi-preview mode of a complex aspect ratio.

26. The mobile terminal of claim 23, wherein the at east one processor is further configured to:
identify a situation, and
exclude a specific aspect ratio from the plurality of different aspect ratios.

27. A non-transitory computer-readable media comprising a program executed by a processor disposed in an apparatus, wherein the program is configured to:
form a plurality of preview windows for each aspect ratio determined by a user while displaying a preview screen,
when the camera is operating in a multi-preview mode, display images with respect to a subject obtained by a camera for each aspect ratio through the plurality of preview windows,
when an input for selecting a preview window from the plurality of preview windows is received, identifying a selected photographing mode,
when the photographing mode is identified as comprising a full preview mode, display a single image of the selected preview window by switching to a full preview according to an aspect ratio of the selected preview window, and
when a photographing command is input by the user while displaying the selected preview window in the full preview mode, control photographing according to the aspect ratio of the selected preview window.

* * * * *